US007610257B1

(12) United States Patent
Abrahams

(10) Patent No.: US 7,610,257 B1
(45) Date of Patent: Oct. 27, 2009

(54) COMPUTER-IMPLEMENTED RISK EVALUATION SYSTEMS AND METHODS

(75) Inventor: Clark Richard Abrahams, Cary, NC (US)

(73) Assignee: SAS Institute Inc., Cary, NC (US)

(*) Notice: Subject to any disclaimer, the term of this patent is extended or adjusted under 35 U.S.C. 154(b) by 450 days.

(21) Appl. No.: 11/651,914

(22) Filed: Jan. 10, 2007

Related U.S. Application Data

(60) Provisional application No. 60/757,648, filed on Jan. 10, 2006.

(51) Int. Cl.
*G06F 15/00* (2006.01)
*G06F 15/18* (2006.01)
(52) U.S. Cl. .................... 706/62; 705/4; 705/38; 705/39
(58) Field of Classification Search ............ 706/62; 705/4, 38, 39
See application file for complete search history.

(56) References Cited

U.S. PATENT DOCUMENTS 6,251,608 B1* 6/2001 Levy .................... 435/6
6,599,702 B1* 7/2003 Levy .................... 435/6
6,613,519 B1* 9/2003 Levy .................... 435/6

OTHER PUBLICATIONS

Economic Estimates of the Value of Life Kahn, Shulamit; Technology and Society Magazine, IEEE vol. 5, Issue 2, Jun. 1986 pp. 24-31 Digital Object Identifier 10.1109/MTAS.1986.5010011.*
Risk Analysis for the Security of VDOT Smart Traffic Centers Bond, E.; Colavito, T.; Luong, T.; Park, G.; Haimes, Y.; Santos, J.; Systems and Information Engineering Design Symposium, 2007. SIEDS 2007. IEEE Apr. 27, 2007 pp. 1-6 Digital Object Identifier 10.1109/SIEDS.2007.4374029.*
Securing information flows: A quantitative risk analysis approach Srivatsa, M.; Rohatgi, P.; Balfe, S.; Military Communications Conference, 2008. MILCOM 2008. IEEE Nov. 16-19, 2008 pp. 1-7 Digital Object Identifier 10.1109/MILCOM.2008.4753319.*
Evaluating risk management strategies in resource planning Andrews, C.J.; Power Systems, IEEE Transactions on vol. 10, Issue 1, Feb. 1995 pp. 420-426 Digital Object Identifier 10.1109/59.373966.*

* cited by examiner

*Primary Examiner*—Michael B Holmes
(74) *Attorney, Agent, or Firm*—Jones Day

(57) ABSTRACT

Computer-implemented systems and methods are disclosed herein that relate to processes, which construct an empirically derived and statistically based risk evaluation and policy formulation system. For example, a process can be configured so as to accept as input an information base in computer readable form and produce either a single or multistage system composed of alternative decision making strategies.

35 Claims, 8 Drawing Sheets

COMPUTER-IMPLEMENTED RISK EVALUATION SYSTEMS AND METHODS

CROSS-REFERENCE TO RELATED APPLICATION

This application claims priority to and the benefit of U.S. Provisional Application Ser. No. 60/757,648, (entitled "Computer-Implemented Risk Evaluation Systems And Methods" and filed on Jan. 10, 2006), of which the entire disclosure (including any and all figures) is incorporated herein by reference.

BACKGROUND AND SUMMARY

The approval and pricing process for loans and insurance has evolved into a complicated decision making process. The scope of loans covered could include, but is not be limited to, credit card, overdraft checking protection, term loans, revolving credit lines, automobile loans (both direct and indirect), mortgages, and small business loans. Types of insurance policies include, but are not restricted to, automobile, renters hazard and theft, homeowners, income continuation, life, accident, and umbrella coverage. Many variables have to be considered when making an approval and/or pricing decision, or in negotiating terms and conditions. To assist in these approvals and pricing/negotiation processes, many different approaches have been used. For example, a technique known as dynamic programming can be used which solves the problem of analyzing multiple relationships by dividing the problem into "decision stages," working backwards from the stated objectives, solving the simplest stages first, and assembling the individual stages into a complete system only after independently solving all of the intermediate stages.

Within this disclosure, computer-implemented systems and methods are disclosed that relate to processes, which construct an empirically derived and statistically based risk evaluation and policy formulation system. For example, a process can be configured so as to accept as input an information base in computer readable form and produce either a single or multistage system composed of alternative decision making strategies. For purposes of illustration, loan approval is used as the primary example. The same methodology applies also to insurance underwriting, loan and insurance policy pricing. The methodology also allows for different approval and pricing strategies based on variations in loan or insurance policy terms and conditions. In the case of loans, this would involve factors such as loan amount tier, the term of the contract, pre-payment penalty, income documentation requirements, etc. On the insurance side, such factors as policy deductible amount, scope of coverage, valuation method for reimbursement on loss of covered items, maximum amount of payout, etc.

As another example, a system and method can be configured to evaluate risks associated with alternative strategies for assessing an entity with respect to a predetermined objective. The system and method can include an action table containing a plurality of possible actions that can be taken with respect to the predetermined objective for various entity profiles. The action table contains an action (e.g., decision) for each entity profile. One or more statistical data stores are configured to contain risk amounts associated with each entity profile and to contain inferred percentage distribution of applicants associated with each entity profile. A profile identification data store contains entity identification information for use in determining an action for the entity. An action is determined for the entity by comparing characteristics associated with the entity with characteristics associated with the entity profiles contained in the action table. An improvement data store provides an indication in the improvement in risk based upon a change in one or more characteristics for an entity profile.

As yet another example, a system and method can be configured to also include a protected class data store that provides an indication of the impact of a policy change on a particular protected class, both with respect to the approval, collection, or promotion decision and relative to one or more characteristics, or combinations of characteristics, for an entity profile.

DETAILED DESCRIPTION

Figure 1:
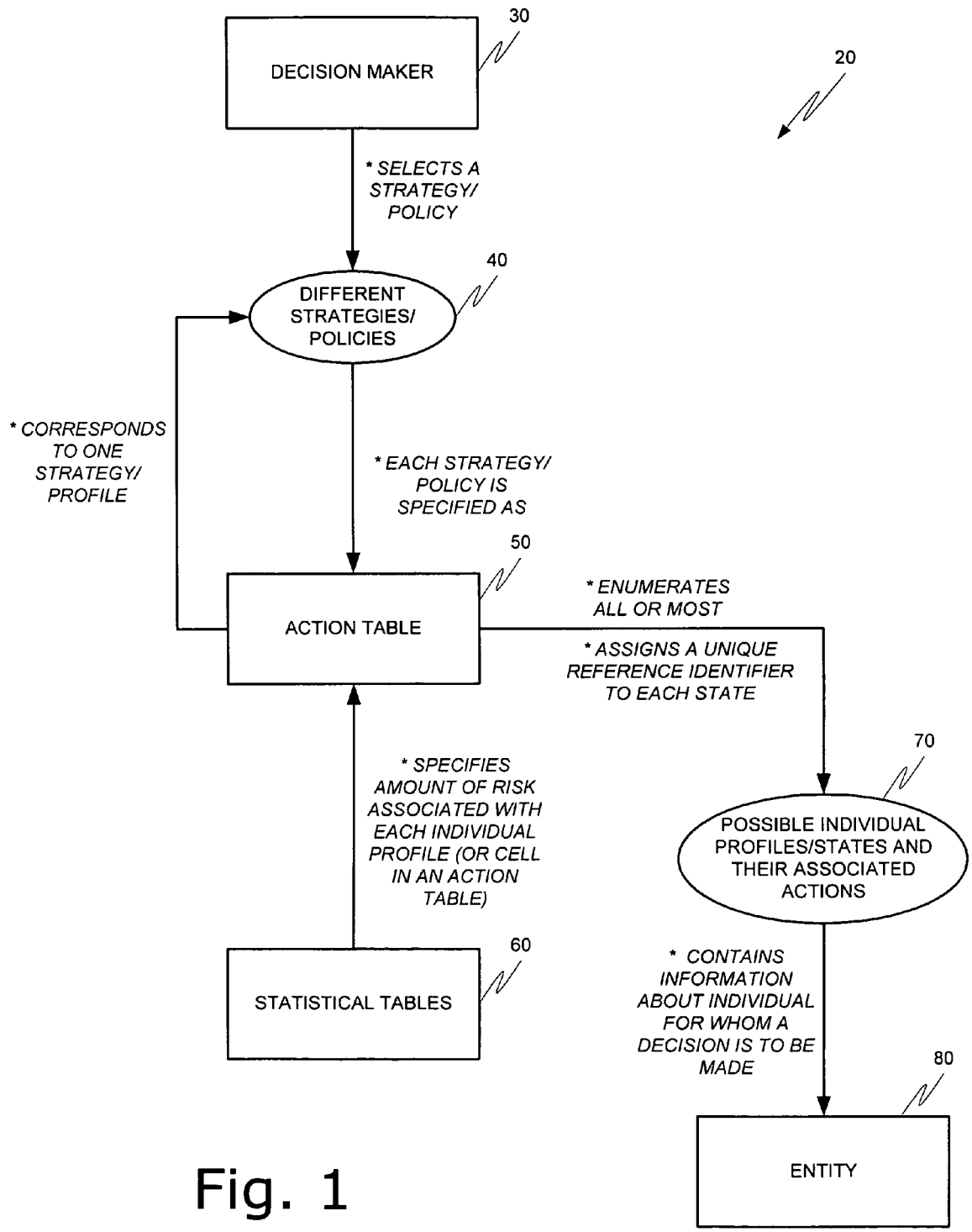
FIG. 1 is a block diagram of different components (e.g., software and computer components) being used within a risk evaluation system.

FIG. 1 depicts at 20 a computer-implemented system to evaluate risks associated with alternative strategies for assessing an entity 80 (e.g., an individual, organization, company, etc.) with respect to a predetermined objective. More specifically, the risk evaluation system allows a decision maker 30 to select from among a number of different strategies 40 in order to arrive at a policy which is aimed at achieving a specific objective.

Each policy is specified in the form of a single, or multi-stage, action table 50 which functions to enumerate all possible states-of-nature (profiles) 70 along with their associated actions. In addition, the action table 50 can assign a unique reference number to every state (or profile) for cross-referencing purposes. Such cross-referencing via action table reference number(s) can have different uses depending upon the application at hand, such as being used to:

A) allow for tracking of overrides originating from declined profiles

B) alleviate the need for sampling during a system update

C) allow for special reports such as delinquency by profile

D) provide information for other marketing activities a) direct response promotions b) credit control research c) automated collection efforts Accompanying the action table 50 is a set of statistical tables 60 which specify the amount of risk associated with each individual profile or cell in the action table 50. Use of these tables 60 enables the decision maker 30 to alter any given policy with a minimum of difficulty.

Figure 2:
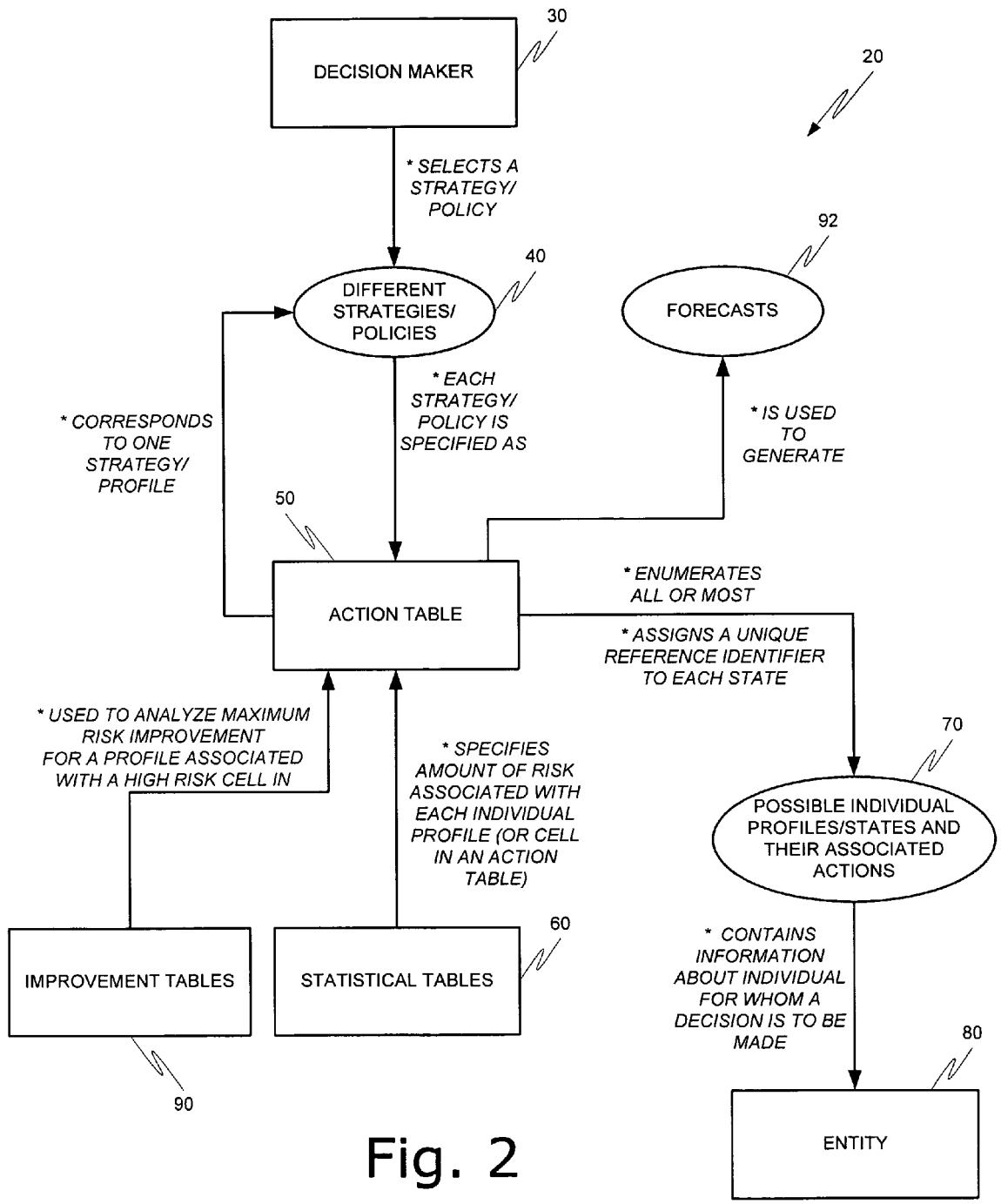
FIG. 2 is a block diagram depicting a risk evaluation system for use in providing improvement in risk.

As depicted in FIG. 2, the risk evaluation system 20 also can provide one or more tables 90 giving the maximum improvement in risk attained by a change in a single factor for every profile corresponding to a high risk cell in the action table 50. In each case a certain number of factors (e.g., the four most significant factors) are ranked in order of importance and the resulting net gain in reduction of risk is indicated for each factor. Also indicated are the new actions which would result in each instance.

Based upon the sampled data, the risk evaluation system 20 provides a forecast 92 of how the total population will be distributed with respect to the various components which make up the total profile on any given entity. Also provided are forecasted acceptance rates by profile components and combinations thereof, as well as percentage distributions of the new acceptee population by their profile components.

A decision maker 30 follows the recommendations stated explicitly in the action table 50 (which she selects based upon the level of risk she is willing to operate at). The risk evaluation system 20 can allow the decision maker 30 to track the system's performance, as well as to alter a current policy.

The risk evaluation system 20 can applied in many different risk-related situations, such as to analyze risk associated with credit approval, direct response promotions, credit collection, insurance underwriting, etc. As an example, consider the application of a risk evaluation system 20 to construct a credit approval system. In such a case if we had a one-step system, then the entries of the action table 50 would state "accept" or "decline" based upon the credit applicant's profile as specified by the action table 50. Two alternative policies corresponding to different action tables might be (1) minimize the credit granting institution's exposure to risk while maintaining the current acceptance rate, or (2) maximize the acceptance rate while maintaining the current bad debt rate.

Figure 3:
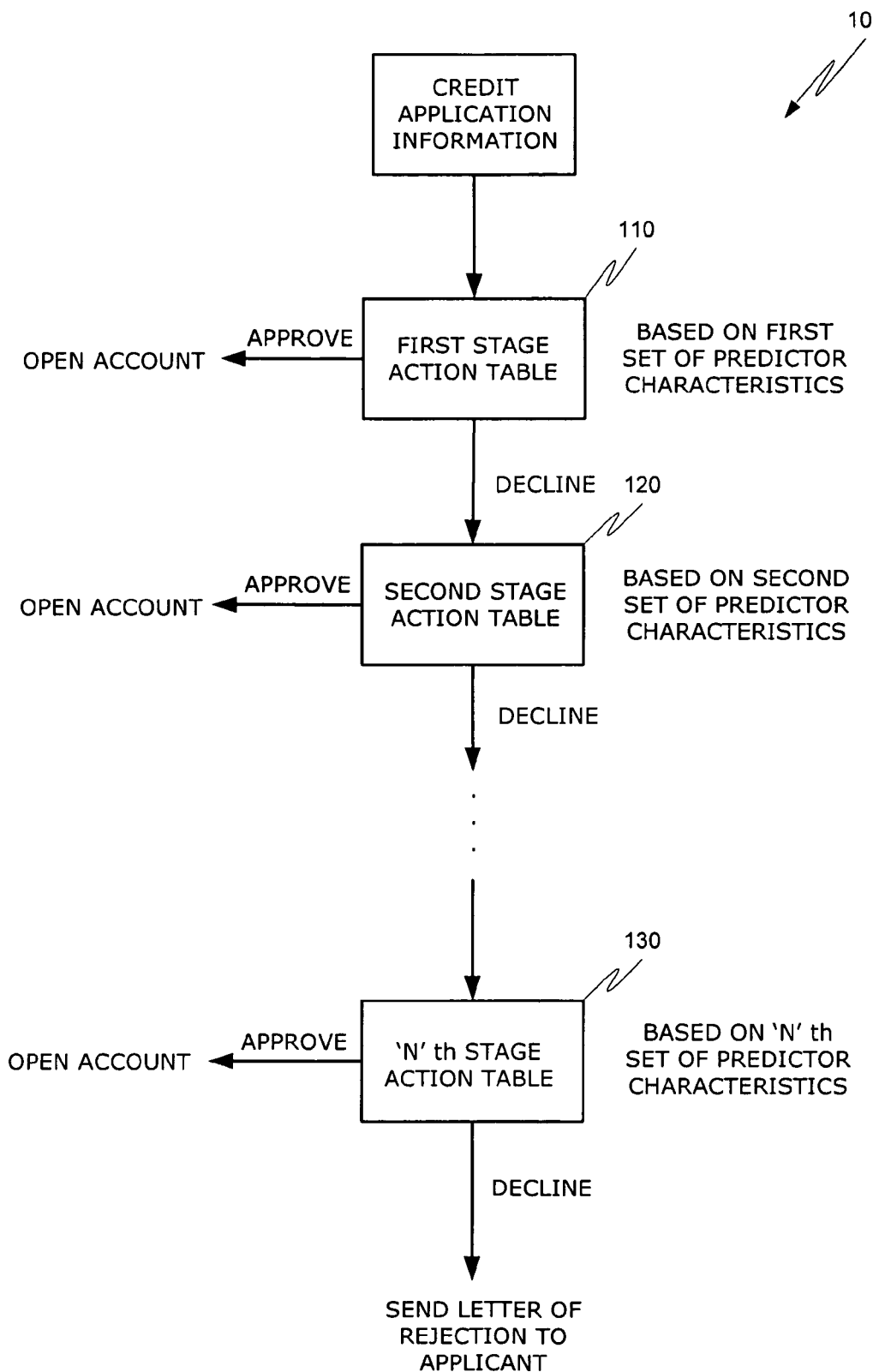
FIG. 3 is a block diagram depicting a multi-stage action situation arising in a credit approval context.

If a multi-stage action situation arises in a credit approval context, then a two-stage system can be constructed as illustrated at 100 in FIG. 3 where the second stage action table 120 includes credit bureau classifications, and the first stage action table 110 would have as entries "approval", "decline" or "investigate" (where investigate implies call the credit bureau and run a check). For those investigated, the second state action table 120 would determine the final outcome of "approve" or "decline".

"N" stages (e.g., "N" stage 130) can be constructed. As an illustration, for a three stage system those declined at one stage proceed to the next stage until they reach the third stage for a final decision. Each credit application could be classified in all stages so as to have "N" ordered action table reference numbers associated with it. This can be used for system updating and could be done regardless of the stage at which the application is actually approved.

FIGS. 4-11 provide an example of software modules operating within a credit approval risk evaluation system. Also below is an explanation of how a risk evaluation system may be modified so as to permit the construction of multistage systems comprised of several action tables which are referenced in sequence in order to arrive at a final decision for a given situation.

Figure 4:
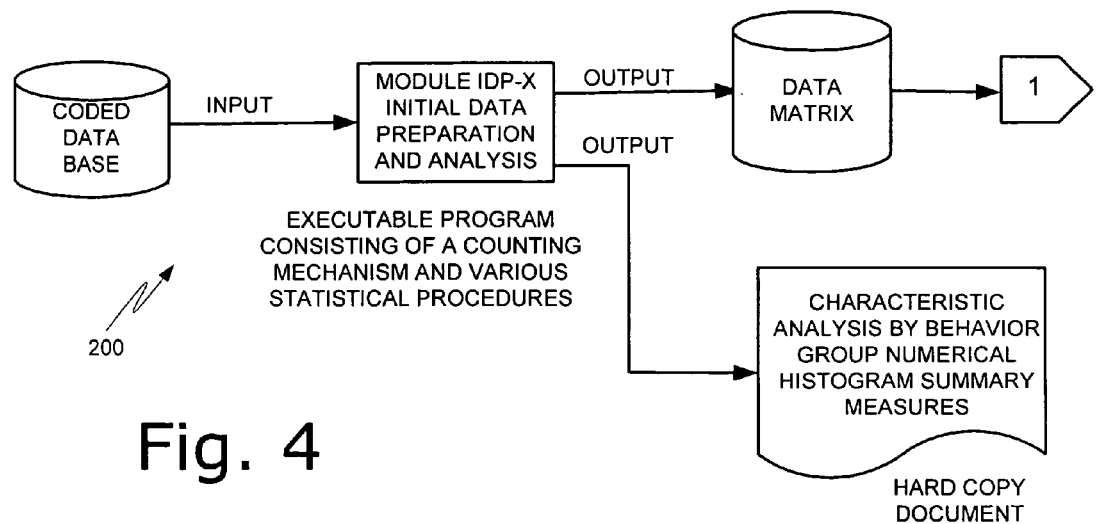
FIGS. 4-11 are flowcharts that provide an example of software modules operating within a credit approval risk evaluation system.

With reference to the processing 200 shown on FIG. 4, module IDP-X tallies the sample population of good, bad and declined credit applicants with respect to one dimension one at a time. Input consists of one record per sampled applicant read in at a time into an integer vector, whose elements serve as pointers. The coded data base which is input to the risk evaluation system could be created in the following way:

A) Detailed and explicit definitions are generated which serve to categorize the client's customers as being either creditworthy or non-creditworthy (i.e. good or bad) as determined by their past performance in paying their bills in a timely manner. Acceptance rates and rates for the occurrence of non-creditworthy customers can also be provided.

B) A population performance audit is run on the client's customer master file in order to determine historical bad rates and identify and flag the good and bad risks as determined by the definitions. In cases where manual transcription of data from hardcopy loan files is required, sampling quotas are established for a statistical sampling plan and a randomized sample candidate selection process is invoked on the flagged master file yielding a specific list of accounts to be sampled. In cases where the data is available electronically, an extraction and pre-processing program is developed to gather all of the data for the time period in question and sampling is not necessary.

C) Next, the actual sampling, or automated extraction, process is conducted, which consists of the gathering of all documents, or electronic information, pertaining to the client's current and past policies which constitute the focus of the study. This includes data from individual credit applications, credit bureau reports, corporate credit policy manuals, etc.

D) The sampled data are reviewed clerically and then transcribed into a coded data base as specified in an accompanying set of coding instructions that have been approved by the client's credit underwriters and operations staff. If the data are already in electronic form, then the review step is all that is required to ensure the integrity of the information collected.

This input can be one record per sampled applicant are read in one at a time into an integer vector, whose elements serve as pointers. The pointers for module are used as addresses in other arrays, one for each dimension which vary in size according to the number of strata present in each. Let the integer vector be denoted as IVEC. Let the separately dimensional array for the first item in the sampled record read in be denoted as TI(5). We have that T1 corresponds to a dimension having five stratum, which are mutually exclusive and exhaustive. Hence, when a record is read in, the program tallies the proper stratum for the first item in the equation:

$$TI(IVEC(1))=TI(IVEC(1))+1$$

The other dimensions are tallied in a similar fashion.

The output from this module is in the form of a separate frequency distribution for each dimension for each behavior group. The between group variation for good and bad behavior is calculated as described in an article by Richard Light and Barry Margolin entitled, "An Analysis of Variance for Categorical Data", which appeared in the *Journal of the American Statistical Association, September* 1971, Vol. 66, page 535, equation (3.4). The Kullback divergence statistic is also calculated for the good versus bad and known versus unknown groups as detailed in a book by Matthew Goldstein and William Dillon entitled *Discrete Discriminant Analysis*, Copyright 1978 by John Wiley & Sons, Chapter 4, Section 4.3.3, page 76, equation (4.3-13).

Example data is given throughout the discussion of FIGS. 4-11 for the various analyses produced by the modules. They are based on a fictitious client—XYZ Department Store.

A portion of the example output for this module is as follows:

Client: XYZ Department Store

Type of System: Credit Approval

Month/Year: February YYYY

Production Module: IDP-X

Characteristic Analysis by Behavior Group

| Dept. Store Ref. | Good | | Bad | | Log | Known | | Unknown | | Log |
|---|---|---|---|---|---|---|---|---|---|---|
| | Count | PCNT | Count | PCNT | Odds | Count | PCNT | Count | PCNT | Odds |
| NONE | 337 | 45.6 | 406 | 55.8 | −0.20 | 783 | 50.4 | 440 | 65.0 | −0.25 |
| ONE or MORE | 449 | 54.4 | 322 | 44.2 | 0.21 | 771 | 49.6 | 264 | 35.0 | 0.35 |

Between Group Variation for Good and Bad Behavior . . . 3.95

Kullback Divergence Statistic Good vs. Bad 0.041 Known vs. Unknown 0.088

| Bank Ref. | Good | | Bad | | Log | Known | | Unknown | | Log |
|---|---|---|---|---|---|---|---|---|---|---|
| | Count | PCNT | Count | PCNT | Odds | Count | PCNT | Count | PCNT | Odds |
| NONE | 67 | 8.1 | 171 | 23.5 | −1.06 | 238 | 15.3 | 189 | 25.1 | −0.49 |
| SAVINGS | 92 | 11.1 | 156 | 21.4 | −0.65 | 248 | 16.0 | 119 | 15.8 | 0.01 |
| CHECKING | 219 | 26.5 | 163 | 22.4 | 0.17 | 382 | 24.6 | 165 | 21.9 | 0.12 |
| BOTH | 448 | 54.2 | 238 | 32.7 | 0.51 | 686 | 44.1 | 281 | 37.3 | 0.17 |

Between Group Variation for Good and Bad Behavior . . . 32.07

Kullback Divergence Statistic Good vs. Bad 0.347 Known vs. Unknown 0.063

The columns entitled "LOG ODDS" were calculated by taking the natural logarithms of the quotient of the first and second figures in the corresponding "PCNT" (percent) columns. The statistical measures described help the analyst to do a quick "eyeball estimation" of the predictive content of each characteristic. This report provides a check on down stream processing which should be fairly consistent with these results. However, IDP-X gives a one dimensional look at the sampled data and hence interdependencies cannot be taken into account by this analysis. It represents a first look at the data.

Figure 5:
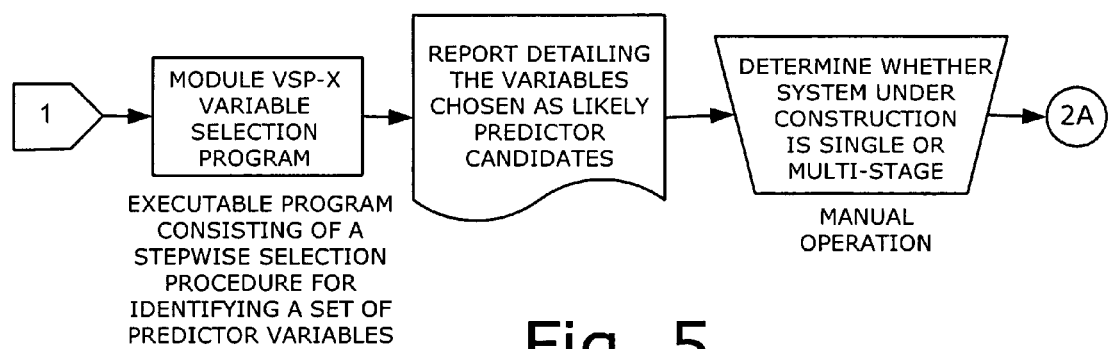

Processing 250 involving module VSP-X is next performed for this example as shown in FIG. 5. (A program flow for this module can be constructed as discussed in the aforementioned U.S. Provisional Application Ser. No. 60/757, 648.) Module VSP-X is a stepwise variable selection procedure that is not restricted to dichotomous responses and that has the desirable property of deleting a variable, once selected, at a later stage. The method is due to J. M. Lachin [1973] "On a stepwise procedure for two population Bayes decision rules using discrete variables," *Biometrics*, 29, pages 551-564. Also refer to discussion in Goldstein and Dillon (previously cited on page 22) Chapter 4, Section 4.3.2, pages 73-75 and Chapter 6, Section 6.6, pages 153-168.

Figure 7:
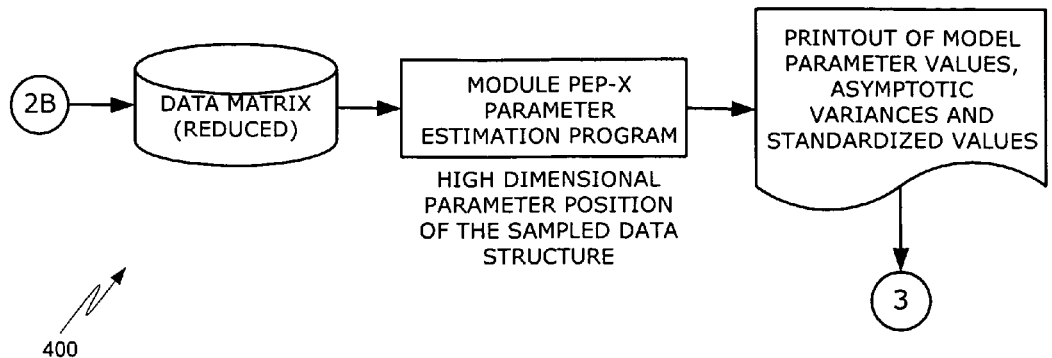

Processing 400 involving module PEP-X is next performed for this example as shown in FIG. 7. The computer module PEP-X derives maximum likelihood estimates for the parameters in a given model. The current version accomplishes the task in up to four dimensions and requires 752K bytes of core memory to execute. In addition, standardized parameter estimates and variances are calculated for main, first and second order effects. Reference: article by Leo A. Goodman in *Technometrics*, Volume 13, Number 1, February 1971, page 38, equation (11).

A portion of the report generated by PEP-X would look as follows:

| Behavior Group | Bad |
|---|---|
| Number of Dimensions | 6 |
| Number of Strata within each dimension | 2 2 2 2 3 4 0 |
| Number of Cells in the 6 dimensional table | 192 |

| No. | Dimension Name | Strata Labels | | | |
|---|---|---|---|---|---|
| 1 | DEPT. STR | NONE | ONE-UP | | |
| 2 | OIL CO. | NONE | ONE-UP | | |
| 3 | MAJOR CC | NO | YES | | |
| 4 | HOUSING | RENT/OTH | OWN/BUY | | |
| 5 | MO. INC. | $0-900 | 901-1499 | $1500-UP | |
| 6 | BANK REF | NONE | SAVE | CHECK | BOTH |

The Grand Mean Effect is 0.903501

Main Effect Terms

| | DIMENSION | MODEL PARAMETER VALUES |
|---|---|---|
| RAW | 1 | 0.038270-0.038270 |
| ASYMPTOTIC VARIANCE | 1 | 0.002840 0.002840 |
| STANDARDIZED | 1 | 0.718164-0.718164 |

| THIRD ORDER INTERACTION TERMS | | | | | |
|---|---|---|---|---|---|
| TERM | I | J | K | L | PARAMETER |
| 1234 | 1 | 1 | 1 | 1 | 0.010614 |
| | 1 | 2 | 1 | 1 | −0.010615 |
| | 2 | 1 | 1 | 1 | −0.010621 |
| | 2 | 2 | 1 | 1 | 0.010612 |
| | . | | | | |
| | . | | | | |
| | . | | | | |

-continued

| 3456 | 1 | 1 | 1 | 1 | −0.093943 |
|------|---|---|---|---|-----------|
|      | 1 | 1 | 2 | 1 |  0.039539 |
|      | 1 | 1 | 3 | 1 |  0.040584 |
|      | 1 | 2 | 1 | 1 |  0.093937 |
|      | 1 | 2 | 2 | 1 | −0.067981 |
|      | 1 | 2 | 3 | 1 | −0.040585 |

Figure 6:
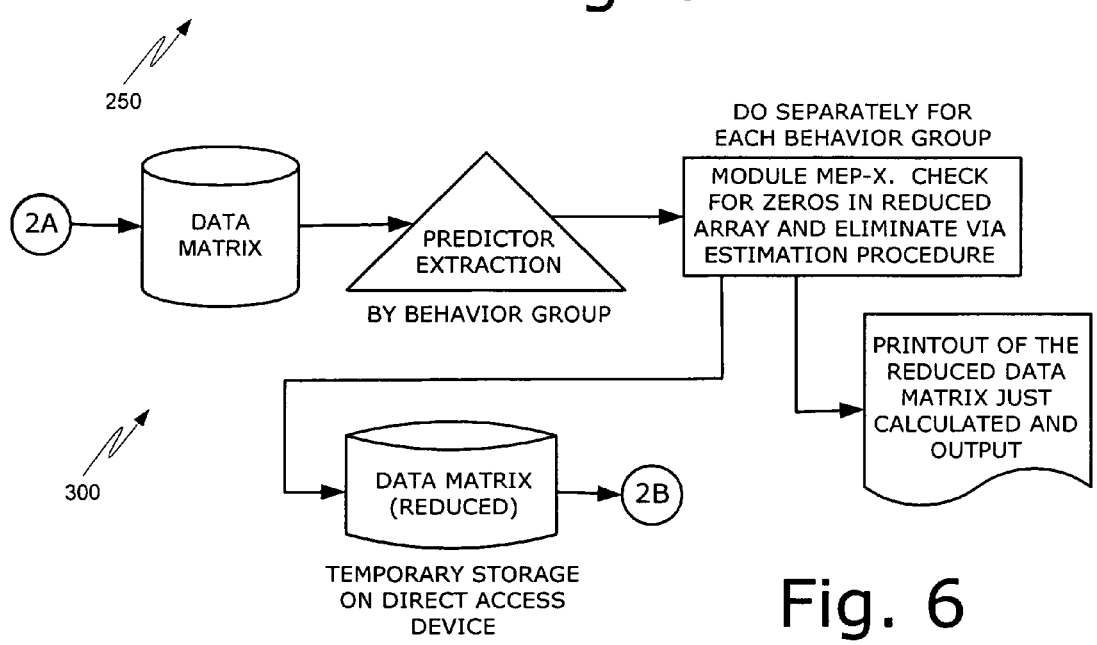
Figure 8:
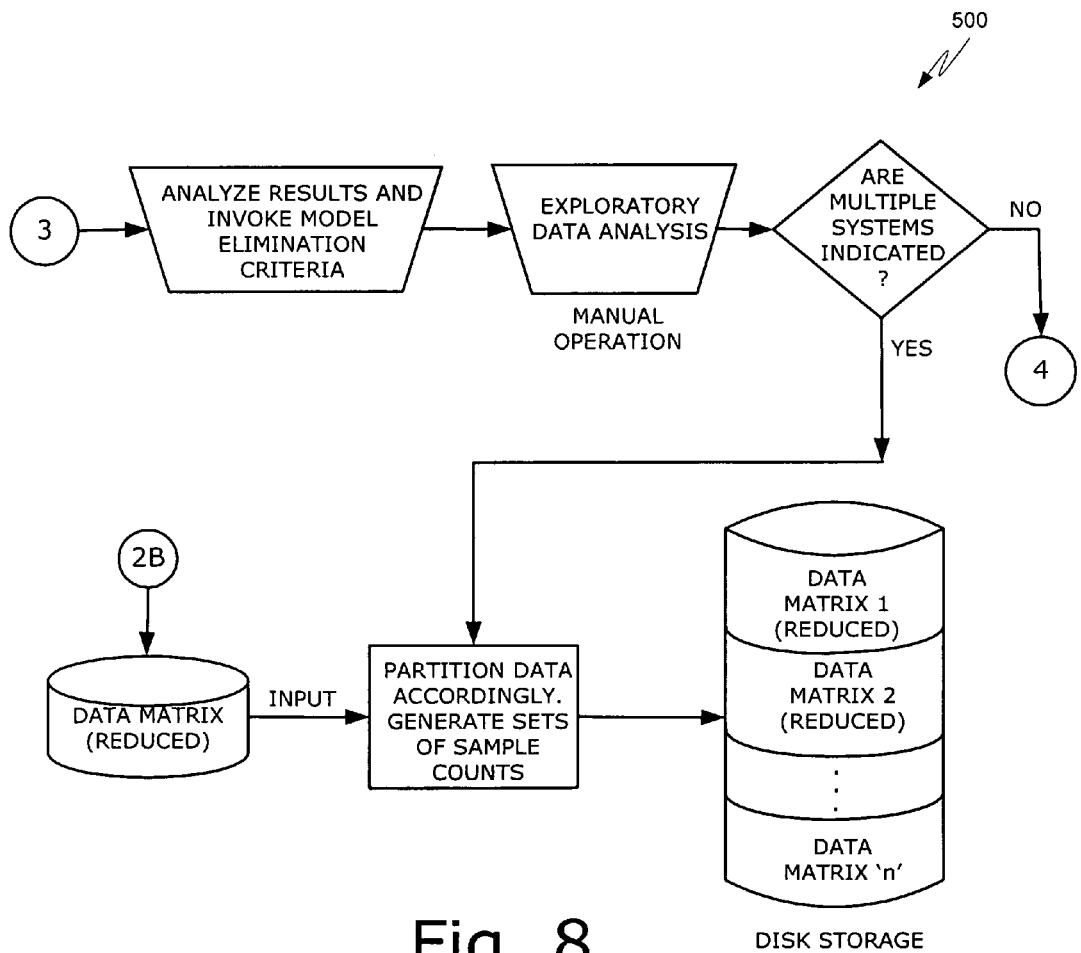
Figure 9:
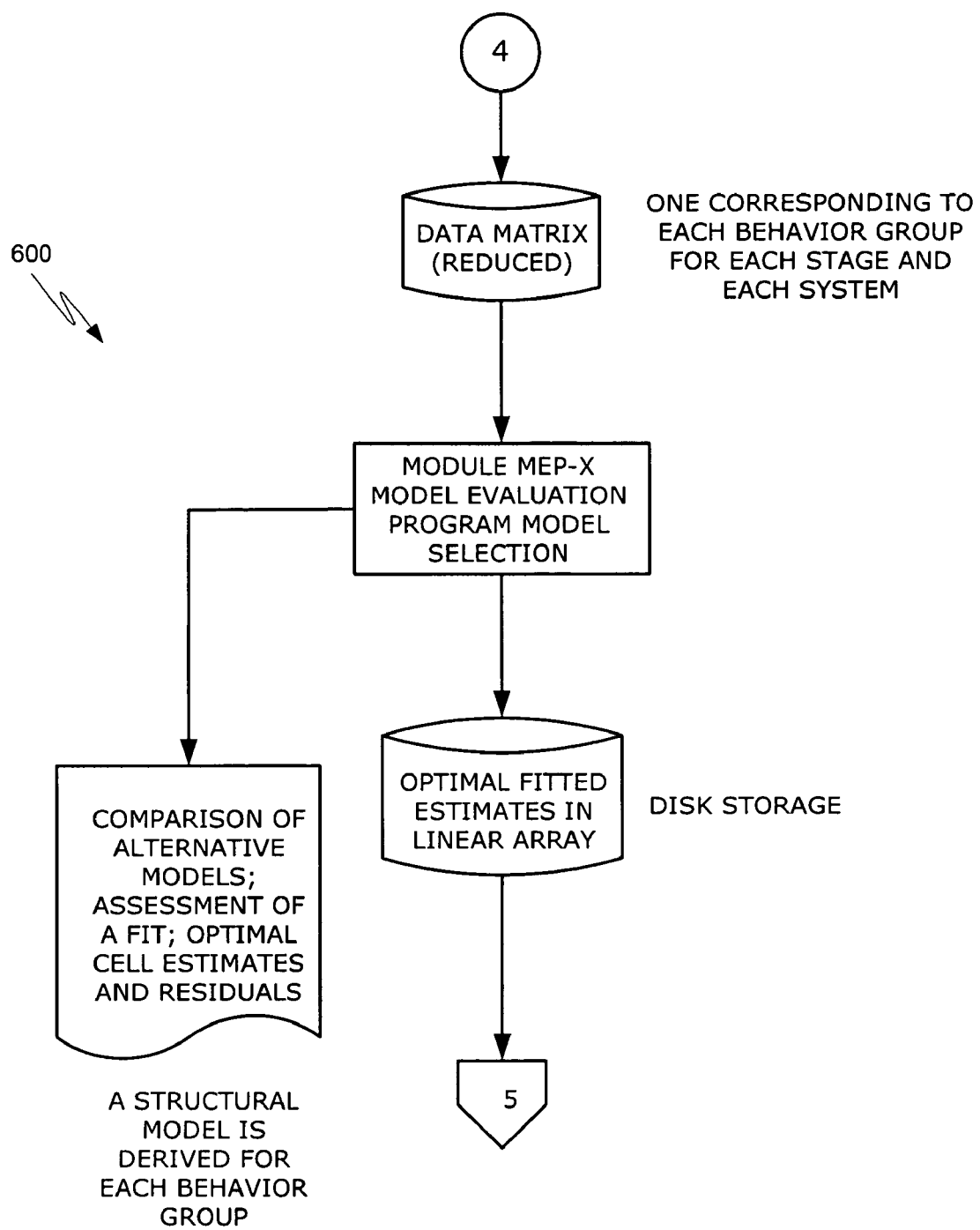

Processing 300, 500, and 600 involving module MEP-X is next performed for this example as shown in FIGS. 6-8. MEP-X sequentially evaluates alternative hierarchical log-linear models for a given set of data. It utilizes an iterative procedure to obtain maximum likelihood estimates of the theoretical values postulated by a given model. This procedure is carried out subject to possible user-specified constraints that certain fixed margins be preserved in the final solution. Two different tests for checking the goodness-of-fit of a particular model are employed. The first is the simple generalization of the Pearson chi-square test statistic, and the second is the likelihood ratio chi-square test statistic. Both have the same asymptotic chi-square distribution. The likelihood-ratio test statistic is also used in the process of selecting a suitable model, via the technique of partitioning.

In addition to providing the fitted cell estimates, the module can also be configured to supply the corresponding standardized residuals as an aid to subsequent analysis. Also a numerical subroutine can be used to compute the chi-square probabilities of the goodness-of-fit statistics, thus alleviating the user of the necessity of making repeated table look-ups for these values.

In the event the user seeks to evaluate a model or data exhibiting structural rather than sampling zeros, he or she may do so by supplying a preliminary fit for it. Tests of various hypotheses, including those of quasi-independence, are performed on such incomplete designs. The program can compute and print any of the various marginal frequencies that the user might find desirable.

In the case where sampling zeros do occur in large numbers, the user may wish to make use of a "built-in" pseudo-Bayes estimation procedure which is superior to the generally accepted practice of adding ½ to the count in each cell of a sparse matrix. This method provides for the selection of a prior array of probabilities which are derived from the observed data. It gives the user an all-purpose method for removing the zeros in an observed frequency distribution.

This module is used to construct structural models for the populations of interest, namely the good, bad and unknown groups. These models specify the final estimated counts as functions of a set of parameters which correspond to the various individual predictor dimensions (called main effects) as well as the multi-way interactions among the predictor dimensions. Consider a one-stage system having six dimensions. Let the indices 1, 2, 3, 4, 5, and 6 correspond to these dimensions and let θ (theta) represent the index set which is comprised of just these indices. Let P (θ) denote the power set of θ (for an explanation of this terminology refer to Paul Halmos, *Naïve Set Theory*, ©1960, Section 5, pp. 19-20). Let $M_1\theta$, $M_2\theta$, and $M_3\theta$ denote, respectively, the final estimated cell counts for the (i, j, k, l, m, n) cell for the good, bad and unknown behavior groups, respectively. Then the structural models previously referred to are of the form:

$$M_{1(\theta)} = \exp\left[\mu_1 + \sum_{i \in I} u_{1i}(\theta)\right], I \subseteq P(\theta)$$

(wherein "I" is a subset of the power set of "θ")

$$M_{2(\theta)} = \exp\left[\mu_2 + \sum_{j \in J} u_{2j}(\theta)\right], J \subseteq P(\theta)$$

$$M_{3(\theta)} = \exp\left[\mu_3 + \sum_{k \in K} u_{3k}(\theta)\right], K \subseteq P(\theta)$$

Where $\mu_1$, $\mu_2$, $\mu_3$ are the grand mean effects.

A specific example of one such structural model for, say, the unknown group (XYZ Dept. Store Project) is given by the following parametric equation:

$$m_{3(\theta)} = \mu_3 + u_1^{(3)}(\theta) + u_2^{(3)}(\theta) + u_3^{(3)}(\theta) + u_4^{(3)}(\theta) + u_5^{(3)}(\theta) + u_6^{(3)}(\theta) + u_{13}^{(3)}(\theta) + u_{16}^{(3)}(\theta) + u_{23}^{(3)}(\theta) + u_{24}^{(3)}(\theta) + u_{26}^{(3)}(\theta) + u_{35}^{(3)}(\theta)$$

where the superscripts are used to indicate the behavior group in order to avoid confusion with the subscripted dimension indices.

The decision procedure used to determine which parameters to include in the model is as follows:

1) Sampling zeros are eliminated from the sampled data via a pseudo-Bayes estimation procedure in MEP-X if necessary.

2) Parameter estimates and their standardized values are derived for the saturated model in PEP-X.

3) An analysis of the standardized parameter values and parameter estimates from module PEP-X is carried out in order to identify the statistically significant effects in the saturated model (saturated refers to all effects assumed present). For example, a seven-dimensional model with all four-way effects present would be comprised of:

$$\sum_{i=0}^{4} \binom{7}{i} 5^i = 35 + 35 + 21 + 7 + 1 = 89 \text{ parameters}$$

Assuming five categories within each dimension, the number of parameter estimates printed would be:

$$\sum_{i=0}^{4} \binom{7}{i} 5^i = 35*5^4 + 35*5^3 + 21*5^2 + 7*5 + 1$$

$$= 21,875 + 4,375 + 525 + 35 + 1 = 26,811$$

4) Using a model which is comprised of only the significant effects found in step (3) as a starting solution, i.e., a basic feasible solution, MEP-X is used to examine, test and compare all adjacent models (i.e., all models differing by just one term) in order to arrive at the optimal one. The procedure is stepwise, starting with the basic feasible solution, and eliminating one term at a time (this is known as backwards elimination as opposed to forward selection). (Refer to Bishop, Fienberg and Holland, *Discrete Multivariate Analysis Theory and Practice*, Copyright 1975 by MIT, Section 4.5, pp. 155-168. Backwards elimination discussed, p. 166 Steps (1) and (2) discussed p. 156—Strategy 1).

In order to decide if multiple systems are indicated, a detailed analysis of the results from PEP-X is carried out. It may happen that significant parameter values occur for different subpopulations, for example, consider:

| TERM | I | J | K | Standardized Estimate | IJK | STD EST | IJK | STD EST | IJK | STD EST | IJK | STD EST |
|------|---|---|---|-----------------------|-----|---------|-----|---------|-----|---------|-----|---------|
| 136  | 1 | 1 | 1 | 1.53                  | 112 | 0.28    | 113 | −1.93   | 114 | −1.91   | 121 | −1.59   |
|      | 1 | 2 | 2 | −0.68                 | 123 | 1.25    | 124 | −0.51   | 211 | −1.51   | 212 | −0.68   |
|      | 2 | 1 | 3 | 1.24                  | 214 | −0.50   | 221 | 1.82    | 222 | 0.28    | 223 | −1.93   |
|      | 2 | 2 | 4 | −1.91                 |     |         |     |         |     |         |     |         |

We find significant interaction of variables (dimensions) 1,3 and 6 for the third and fourth levels of dimension 6 when dimensions 1 and 3 are both on the same level (i.e. 1 or 2).

In this example, the dimensions are:

| No. | Name      | Strata | 1    | 2      | 3     | 4    |
|-----|-----------|--------|------|--------|-------|------|
| 1   | DEPT. STR.|        | NONE | ONE-UP |       |      |
| 3   | MAJOR CC  |        | NO   | YES    |       |      |
| 6   | BANK REF  |        | NONE | SAVE   | CHECK | BOTH |

The interpretation is as follows: There is a significant interaction between the $1^{st}$, $3^{rd}$ and $6^{th}$ dimensions for the cases when either:

A) No department store or major credit card references are given and the applicant has either a checking account or both a checking and savings account, or B) Both department store and major credit card references are given and the applicant has either a checking account or both a checking and savings account.

Thus we may wish to split the data base on the dimensions "Bank REF" building a separate system for those with no references or just a savings account and one for those having a checking account or both a checking and savings account. Another possible split would be to combine the department store and major credit card references into one 4-level variable and split on those who have either both or neither references and those who have at least one but only one of the two. A final possibility would be to combine all three dimensions and build separate systems for the derived groups of sub-classifications. The first and second alternatives would result in 2 systems. The third could result in 16 systems.

In the case of loans covered under Regulation C, Home Mortgage Disclosure Act (1975), the protected class status relative to race/ethnicity and gender are available. Hence it is possible to perform analysis and fit log-linear models to specific protected class and control group populations, such as Hispanic, African-American, Asian-American, Native-American, White Non-Hispanic, female, and male classifications. In this way, distinct risk models can be developed for different groups based upon protected class status, e.g. by race/ethnicity for accept, reject, good and bad populations. This information details explicit relationships that can be used to derive equally predictive credit approval models, while treating a protected class more favorably. The same can be done relative to loan pricing, marketing, or product selection.

Figure 10:
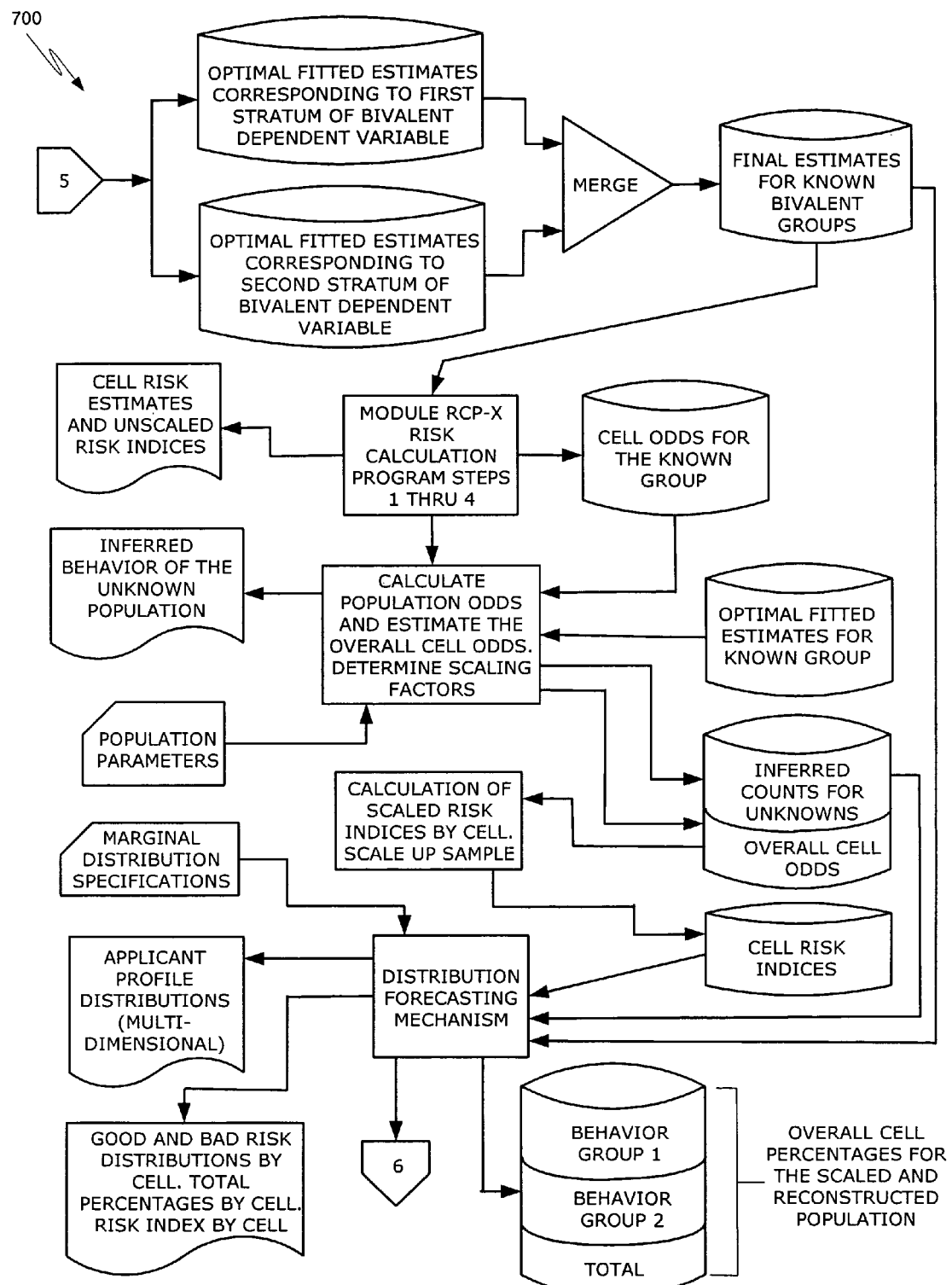

Processing 700 involving module RCP-X is next performed for this example as shown in FIG. 10. Four top-levels steps are performed involving module RCP-X. With respect to these top-level steps, the logical flow and calculations in module RCP-X are as follows:

1. Input optimal cell estimates for known population from disk storage.
2. Convert raw counts to percentages separately for the two behavior groups (good and bad).
3. Calculate the odds ratio based on good/bad percentages for every cell along with its logarithm base e.
4. Output table of cell risk estimates and un-scaled indices.
5. Input the acceptance rate and bad rate for the known population.
6. Calculate the expected number of sampled goods and bads in the unknown population as follows:

Let $TL(I)$=risk estimate for the $I^{th}$ cell
$TU(I)$=unknown count for the $I^{th}$ cell
$B1$=known bad rate
$B(I)$=number of expected goods in the unknown population for $I^{th}$ cell.
$G(I)$=number of expected bads in the unknown population for $I^{th}$ cell.
Then, $$B(I)=(1.0/(1.0+TL(I)*((1.0-B1)/B1)))*TU(I)$$

$$G(I)=TU(I)-B(I)$$

7. Calculate the population odds as follows:
Let $B2$=bad rate for the unknown population
$SUMB$=total number of inferred bads in the unknown population
$SUMU$=total number of sampled unknowns
$FB$=overall fraction of bads
$A$=acceptance rate
Then, $$B2=SUMB/SUMU$$

$$FB=A*B1+(1.0-A)*B2$$

And the population odds=$P=(1.0-FB)/FB$

8. Output the table of inferred cell estimates, e.g.

| BANK REF | MO. Inc. | HOUSING  | MAJOR CC | OIL CO. DEPT. STR | NONE NONE | NONE ONE-UP | ONE-UP NONE | ONE-UP ONE-UP |
|----------|----------|----------|----------|-------------------|-----------|-------------|-------------|---------------|
| NONE     | $0-900   | RENT/OTH | NO       | UNKNOWN           | 20.2709   | 9.2697      | 2.1231      | 0.9709        |
|          |          |          |          | EXPT. BDS         | 9-3802    | 3.3723      | 0.4849      | 0.1514        |
|          |          |          |          | EXPT GDS          | 10.8907   | 5.8974      | 1.0383      | 0.8195        |

9. Scale counts for each population, so as to arrive at a model based on 10,000 applicants.

10. Calculate scaled risk indices by cell.

After step 9 summary statistics are printed as follows:
- Minimum unscaled index was −2.97786
- Maximum unscaled index was 2.84800
- The average index was 0.02411
- Acceptance Rate 0.5500
- Bad Rate for the knowns 0.0420
- Bad Rate for the unknowns 0.1162
- Number of unknown bads 88
- Number of unknowns 754
- The Population Odds 12.3/1.0
- Known Goods 5269
- Inferred Goods 3977
- Total Goods 9246
- Known Bads 231
- Inferred Bads 523
- Total Bads 754

11. Output table giving good and bad risk distributions by cell (scaled to 10,000 applicants), applicant percentages by cell and risk index by cell, e.g.:

| BANK REF | MO. Inc. | HOUSING | MAJOR CC | OIL CO. DEPT. STR | NONE NONE | NONE ONE-UP | ONE-UP NONE | ONE-UP ONE-UP |
|---|---|---|---|---|---|---|---|---|
| NONE | $0-900 | RENT/OTH | NO | Goods | 71 | 43 | 17 | 16 |
| | | | | Bads | 61 | 24 | 5 | 3 |
| | | | | % Applicant | 1.32 | 0.67 | 0.21 | 0.19 |
| | | | | Index | 203. | 211. | 224. | 234. |

12. Print Applicant Population Distributions for Stability Analyses, e.g.:

| APPLICANT | FORECAST | DEPT. STR. |
|---|---|---|
| DEPT. STR | | |
| NONE | 54.38 | |
| ONE-UP | 45.42 | |

| APPLICANT | FORECAST | DEPT. STR BY MAJOR CC BY HOUSING | |
|---|---|---|---|
| HOUSING | MAJOR CC | DEPT. STR. NONE | ONE-UP |
| RENT/OTH | NO | 17.64 | 12.36 |
| RENT/OTH | YES | 12.82 | 12.42 |

| | | | | -continued | | |
|---|---|---|---|---|---|---|
| OWN/BUY | NO | | | | 12.76 | 9.62 |
| OWN/BUY | YES | | | | 11.35 | 11.02 |

13. Output to disk overall percentages by cell and risk indices by cell.

Figure 11:
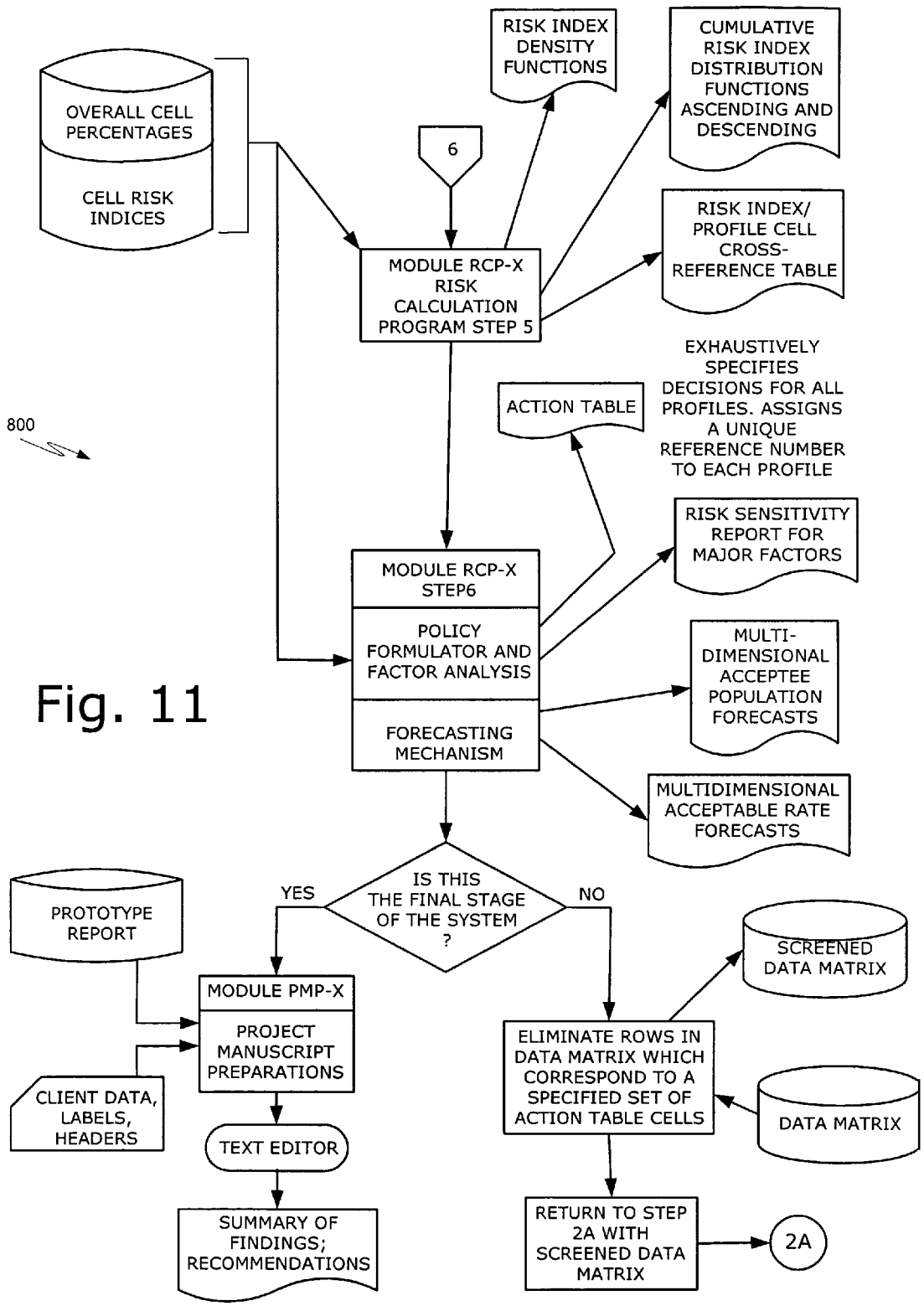

Processing 800 involving the fifth top-level step of module RCP-X is next performed for this example as shown in FIG. 11. The logical flow is as follows:

1. Read in input description card, scores and percentages.
2. Sort the array of risk indices via pointer indices in a dummy vector.
3. Consolidate and sort good, bad and applicant percentages based on risk indices.
4. Sort cell addresses for each risk level in place in an array.
5. Print linear cell addresses for every risk index. This reference will be helpful in determining exactly the profile of those groups to be affected by a particular cutoff strategy.
6. Compute counts and odds by cell. Counts for each strata are scaled so as to arrive at 10,000 applicants. Print the risk index density functions, e.g.

| | GOOD | | BAD | | TOTAL | | | |
|---|---|---|---|---|---|---|---|---|
| RISK INDEX | NBR | PCNT | NMBR | PCNT | NMBR | PCNT | ODDS | CELLS |
| 203 | 71 | 0.8 | 61 | 8.1 | 132 | 1.3 | 1.2 | 1 |
| 209 | 50 | 0.5 | 32 | 4.2 | 82 | 0.8 | 1.6 | 1 |
| 211 | 114 | 1.2 | 66 | 8.8 | 181 | 1.8 | 1.7 | 2 |

7. Compute Ascending Cumulative Risk Index Distribution Functions and print them, e.g.

| 203 | 71  | 0.8 | 61  | 8.1  | 132 | 1.3 | 1.2 | 1 |
| 209 | 121 | 1.3 | 93  | 12.3 | 214 | 2.1 | 1.3 | 2 |
| 211 | 235 | 2.5 | 159 | 21.1 | 394 | 3.9 | 1.5 | 4 |

8. Compute Descending Cumulative Risk Index Distribution Functions and print them, e.g.

|  | GOOD | | BAD | | TOTAL | | | |
| --- | --- | --- | --- | --- | --- | --- | --- | --- |
| RISK INDEX | NBR | PCNT | NMBR | PCNT | NMBR | PCNT | ODDS | CELLS |
| 259 | 5356 | 57.9 | 95  | 12.6 | 5454 | 54.5 | 56.2 | 106 |
| 258 | 5370 | 58.1 | 96  | 12.7 | 5466 | 54.7 | 55.9 | 107 |
| 257 | 5620 | 60.8 | 110 | 14.6 | 5731 | 57.3 | 50.9 | 113 |

(above is an excerpt from the printout centered about the current acceptance rate of 55%~54.7 at risk level 258 which corresponds to maintenance of the current acceptance rate.)

An example of the printout from Step (5) is:

Reference Table Enumerating all Cells which Correspond to each Risk Level:

| Index | Number | Corresponding Cell Addresses (sorted into Increasing Order) | | | | | | |
| --- | --- | --- | --- | --- | --- | --- | --- | --- |
| 203 | 1 | 1   |     |     |     |     |     |     |
| 209 | 1 | 9   |     |     |     |     |     |     |
| 211 | 2 | 2   | 17  |     |     |     |     |     |
| 215 | 1 | 10  |     |     |     |     |     |     |
| 218 | 2 | 18  | 25  |     |     |     |     |     |
| 220 | 1 | 33  |     |     |     |     |     |     |
| . | | | | | | | | |
| . | | | | | | | | |
| . | | | | | | | | |
| 257 | 6 | 29  | 54  | 68  | 69  | 70  | 178 |     |
| 258 | 1 | 87  |     |     |     |     |     |     |
| 259 | 2 | 56  | 179 |     |     |     |     |     |
| 260 | 7 | 23  | 71  | 88  | 116 | 148 | 154 | 155 |
| 261 | 1 | 108 |     |     |     |     |     |     |
| . | | | | | | | | |
| . | | | | | | | | |
| . | | | | | | | | |
| 315 | 1 | 189 | | | | | | |
| 317 | 1 | 192 | | | | | | |
| 320 | 1 | 190 | | | | | | |

The subroutine calling sequence is shown in FIG. 12.

Processing 800 involving the sixth top-level step of module RCP-X is next performed for this example as shown in FIG. 11. The logical flow is as follows:

1. Input control information, scores, and percentages.

2. Read in current policy cutoff to maintain acceptance (or bad) rate along with the dimension of the array which is to hold all marginal tables.

3. Build the Action Table.

4. Create array of percentages for acceptee population.

5. Output the decision table, e.g.

XYZ Department Store Action Table for Granting Credit Accounts

Developed By STATCOMP Effective Date: February YYYY

Strategy: Maintain Current Acceptance Rate

| BANK REF | MO. Inc. | HOUSING | MAJOR CC | OIL CO. DEPT. STR | NONE NONE | NONE ONE-UP | ONE-UP NONE | ONE-UP ONE-UP |
| --- | --- | --- | --- | --- | --- | --- | --- | --- |
| NONE | $0-900 | RENT/OTH | NO | CELL NO. ACTION | 1 Decline | 2 Decline | 3 Decline | 4 Decline |
| . | | | | | | | | |
| . | | | | | | | | |
| NONE | $901-1499 | OWN/BUY | YES | CELL NO. ACTION | 29 Decline | 30 Decline | 31 Approve | 32 Approve |
| . | | | | | | | | |
| . | | | | | | | | |

(6) Print Decline Analysis, e.g.

The following table gives the maximum improvement in risk level to be achieved by a change in any one of the four most important factors indicated for all applicant profiles corresponding to decline cells in the action table. Also, included in the table are the new actions which would result if each of the four possible changes were to have occurred individually.

| ACTION TABLE REF. NO. | FACTOR 1 NET GAIN RESULT | FACTOR 2 NET GAIN RESULT | FACTOR 3 NET GAIN RESULT | FACTOR 4 NET GAIN RESULT |
|---|---|---|---|---|
| 1 | MAJOR CC 47 DECLINE | BANK REF 30 DECLINE | OIL CO. 21 DECLINE | MO. INC. 18 DECLINE |
| 2 | MAJOR CC 40 DECLINE | BANK REF 34 DECLINE | OIL CO. 23 DECLINE | MO. INC. 16 DECLINE |
| 3 | MAJOR CC 28 DECLINE | BANK REF 19 DECLINE | MO. INC. 19 DECLINE | DEPT. STR. 9 DECLINE |
| . | | | | |
| . | | | | |
| . | | | | |
| 15 | BANK REF 40 APPROVE | MO. INC. 21 APPROVE | DEPT. STR. 1 DECLINE | OIL. CO. 0 DECLINE |
| . | | | | |
| . | | | | |
| . | | | | |
| 169 | MAJOR CC 49 APPROVE | OIL CO. 16 APPROVE | DEPT. STR. 12 APPROVE | MO. INC. 10 APPROVE |
| . | | | | |
| . | | | | |
| . | | | | |
| 178 | MAJOR CC 46 APPROVE | HOUSING 20 APPROVE | OIL CO. 16 APPROVE | DEPT. STR. 0 DECLINE |

(7) Print Multidimensional Acceptee Regulation Forecasts, i.e.

| ACCEPTEE POPULATION | DEPT. STR. |
|---|---|
| DEPT. STR. | |
| NONE | 45.79 |
| ONE-UP | 54.21 |
| . | |
| . | |
| . | |

| ACCEPTEE | POPULATION | DEPT. STR. | BY OIL CO. | BY MO. INC. |
|---|---|---|---|---|
| MO. INC. | OIL. CO. | DEPT. STR. | NONE | ONE-UP |
| $0-900 | NONE | | 7.94 | 9.00 |
| $0-900 | ONE-UP | | 4.15 | 6.91 |
| 901-1499 | NONE | | 7.56 | 9.66 |
| 901-1499 | ONE-UP | | 5.39 | 7.50 |
| $1500-UP | NONE | | 14.06 | 12.31 |
| $1500-UP | ONE-UP | | 6.69 | 8.77 |
| . | | | | |
| . | | | | |
| . | | | | |

(8) Print Multidimensional Acceptance Rates, i.e.

| ACCEPTANCE RATES: | DEPT. STR. | | |
|---|---|---|---|
| DEPT. STR. | | | |
| NONE | 45.85 | | |
| ONE-UP | 65.24 | | |
| . | | | |
| . | | | |
| . | | | |
| ACCEPTANCE RATES: | MAJOR CC | BY | HOUSING |
| HOUSING | MAJOR CC | NO | YES |
| RENT/OTH | | 7.60 | 82.18 |
| OWN/BUY | | 47.59 | 93.78 |
| . | | | |
| . | | | |
| . | | | |

Note that the applicant forecast for DEPT. STR is:

| NONE | 54.38 |
|---|---|
| ONE-UP | 45.42 |

From above we have the acceptee percentage split is:

| NONE | 45.79 |
|---|---|
| ONE-UP | 54.21 |

And the acceptance rates are:

| NONE | 45.85 |
|---|---|
| ONE-UP | 65.24 |

Recall that the overall acceptance rate is 55%. Hence, based on 10,000 applicants we have:

NONE 5438×(0.4585)/5,500=45% of acceptees ✓

ONE-UP 4542×(0.6524)/5,500=54% of acceptees ✓ and the forecasts are consistent.

Steps (2)-(8) are repeated for the strategy which maintains the current bad debt rate.

A program flow for these steps can be constructed as discussed in the aforementioned U.S. Provisional Application Ser. No. 60/757,648. As an example, the module can invoke another subroutine or module to provide the following operations:

(1) An array of action table cell reference numbers (addresses) is passed to it from the main program (these correspond to decline cells) along with the total number of decline cells.

(2) An n-tuple is calculated for each address passed.

(3) Next, a search is made over a set of generated n-tuples differing only in one coordinate from the address being examined.

(4) Differences in risk indices are calculated over the generated set of n-tuples to determine the maximum improvement in risk by a change in any one coordinate.

(5) Finally, the decline factors are rank ordered and the four most significant ones are output.

From item (8) and item (10), we project that a reduction in bads of [(231.96)/231]=58.4% can be achieved while maintaining the current acceptance rate.

The math is: 58.4%=[(0.0420)−(96/5466)]/(0.0420) (row with Risk Index=258: Bad NMBR/Total NMBR)=(96/5466) and, the bad rate for the knowns=0.0420. If you divide the numbers, you get 58.18, which is not exactly equal to 58.4. That is because the risk index cut-off of 258 corresponds to a 54.7% acceptance rate, not a 55% acceptance rate. For setting cut-offs, this is an acceptable approximation.

Following is an assessment of this policy's effect on the known sampled applicants:

Under the Maintain Current Acceptance Rate Strategy:

|  | DECLINES | | | |
| --- | --- | --- | --- | --- |
| BANK REF | BAD | GOOD | NUMBER | SAMPLED |
| NONE | 157 | 39 | GOOD | 826 |
| SAVINGS | 125 | 51 | BAD | 728 |
| CHECKING | 107 | 48 | | |
| BOTH | 148 | 70 | NO. GOODS TURNED | |
| | | | DOWN = 208 | |
| | 537 | 208 | NO. BADS ACCEPTED = 728 − 537 = 191 | |

Comparison of Rates of Error:

| For Good Group | 208/826 = 25% |
| --- | --- |
| For Bad Group | 191/728 = 26% |
| For Known Group | (208 + 191)/(826 + 728) = 399/1554 = 26% |

Thus, 74% of the original population is distinguishable by the system using this strategy.

Now, the 26% error rate computed for bads implies we should be able to cut the bad rate by 74% while the table shows only a 58% reduction. The reasons for this are:

1) The declines assigned caused more overlap among the good and bad populations, i.e., made them less distinguishable, and 2) Here we are working off the sampled counts rather than the final estimates.

Multistage Sequential Credit Approval System Development Example

Benefits of this approach:

1) Smaller development sample size required, although all of the data should be utilized when readily electronically available 2) Increased accuracy in risk estimation with respect to the structural modeling aspect. Analogous to multiple system development.

Instead of having just one action table, the risk evaluation and policy formulation system would be comprised of two or possibly three action tables (or more). The dimensions of the first action table would be the most significant characteristic in terms of their predictive power (additional consideration may be given to characteristics which are also the least objectionable from a legal standpoint and the easiest to use to classify credit applicants). For example, whether or not the applicant has a checking account should have significant predictive power while being most acceptable from an ECOA standpoint (anyone can open a checking account regardless of economic status) and it is easy to determine as opposed to calculating a debt ratio or classifying an employer or occupational title. The first action table would typically be made up of from four to seven variables (possibly more, especially if there are more dichotomous variables which would mitigate the problem of generating too large a profile set. E.g. ten dichotomous variables would result in 1,024 distinct profiles, or action table cells, which is identical to that which would result from having only five variables, where each of the five individual variables can take on any one of four possible values.). The number of variables in the first action table would depend upon the number of predictor variables available, and their nature with respect to the above criteria. The second action table would consist of another set of predictors which may be required to compensate for any weaknesses among the stage one variables, or are a bit more difficult to classify (e.g. debt ratio, occupation, etc.), or less desirable from an ECOA compliance standpoint, e.g., occupation, number of dependents, age, etc. Again, the same reasoning would apply to the third stage. Credit bureau predictors may comprise a separate stage, or be intermixed with applicant-supplied information in any stage.

How the Multistage System would operate: If the application cannot be either declined or approved (i.e. some final or definitive action taken) at the first stage, it proceeds to the next stage for further classification, and possible final action, and so on.

A decision model such as this is more complicated than the single action table system in several respects. Following is an enumeration of the added difficulties and their proposed solutions:

7) Effect on Structural Model:

For the first action table we have $$M_\theta^{(1)} = \exp\left[\mu_1^{(1)} + \sum_{i \in I} u_i^{(1)}(\theta)\right], I \subseteq P(\theta)$$

(for the good behavior group, denoted by superscript "(1)".)

$$M_\theta^{(2)} = \exp\left[\mu_1^{(2)} + \sum_{j \in J} u_i^{(2)}(\theta)\right], J \subseteq P(\theta)$$

(for the bad behavior group, denoted by superscript "(2)".)

Similarly, for the second action table we have $$M_\xi^{(1)} = \exp\left[\mu_2^{(1)} + \sum_{k \in K} u_k^{(1)}(\xi)\right], K \subseteq P(\xi)$$

and $$M_\xi^{(2)} = \exp\left[\mu_2^{(2)} + \sum_{l \in L} u_l^{(2)}(\xi)\right], L \subseteq P(\xi)$$

The combined model is of the form:

$$M_\psi^{(1)} = \exp\left[\mu_1^{(1)} + \sum_{i \in I} u_i^{(1)}(\theta)\right] * \exp\left[\mu_2^{(1)} + \sum_{k \in K} u_k^{(1)}(\xi)\right]$$

and $$M_\psi^{(2)} = \exp\left[\mu_1^{(2)} + \sum_{j \in J} u_j^{(2)}(\theta)\right] * \exp\left[\mu_2^{(2)} + \sum_{l \in L} u_l^{(2)}(\xi)\right]$$

where $\psi = \{\theta \cup \xi\}$. If we denote the odds quote in a cell of the two-stage action table by $$\omega_\psi = \frac{M_\psi^{(1)}}{M_\psi^{(2)}}$$

then we have $\omega_\psi = \omega_\theta * \omega_\xi$, i.e., a direct product of the one stage structural model with the second stage structural model.

With the one stage system the cell odds estimate is $\omega_\theta$, so that $\omega_\psi = \omega_\theta * \omega_\xi$ amounts to a refinement of the stage one estimate. Note the assumption of independence here. The justification for this assumption is two-fold:

A) Independence need not hold for the group of applicants approved at the first stage since their odds estimate is never refined further;

B) Any approximations derived without the assumption would be less accurate since abandonment at the assumption would entail the calculation of a matrix of conditional probabilities at the form $P(\omega_\xi|\theta)$ which represents n×m terms (where n, m are the number of cells in action tables one and two respectively) and, in many instances, the data are too sparse for these calculations to be meaningful.

The multi-stage approach is not dependent upon this assumption of independence, and alternative dynamic conditional estimates can be used in place of the cell odds that are calculated as a direct product as described previously. In this case, the two-stage cell odds relationship would be represented as: $\omega_\psi \cong f(x_{11}, x_{12}, x_{13}, \ldots, x_{1n}; x_{21}, x_{22}, x_{23}, \ldots, x_{2m})$, where $f$ is a function whose domain of values are the combined values of the variables that comprise the union of the two sets of "n" variables for stage one and "m" variables for stage two, and whose range is a real number interval that is bounded above and below. The form of this function $f(\cdot)$ may be specified by a pooled set of conditional equations based on estimated linkages and multi-dimensional interactions between the factors appearing in the two stages. This result generalizes directly to cases where there are three or more action table stages present.

We cannot use the entire population to estimate $\psi_\xi$ since those approved in stage one are no longer to be considered in the decision process. Thus, the stage one action table induces a partition on the development sample. It will, however, be desirable to include some sample points having profiles with associated risk indices close to the cutoff, but on the approved side, in the second stage development sample. This is because there may be changed in the acceptance policy by a client and in the event the stage one approval policy were made tighter, we would want the second stage risk estimates to be valid for those new profiles being judged for the first time by the second stage action table. On the other hand, this precaution may not be necessary, provided that the Client regulate the approval rate by adjusting the second stage of the system only. We may describe the portion of the original development sample used for the stage two development sample as follows:

|   |   |   | Risk Index | Total Applicants (Cumulative %) |
|---|---|---|---|---|
| I.: | Stage 1 approvals. | I | 350 | 2.0 |
|   |   |   | 349 | 4.0 |
|   |   |   | . |   |
|   |   |   | . |   |
|   |   |   | . |   |
|   |   |   | 275 | 43.0 |
| II.: | Marginal above cutoff approvals (perhaps 10% of the overall applicants) | II | 274 | 45.0 |
|   |   |   | 273 | 47.0 |
|   |   |   | 272 | 49.0 |
|   |   |   | 271 | 51.0 |
|   |   |   | 270 | 53.0 |
| III.: | Declines from stage 1 | III | 269 | 55.0 cutoff for no change in acceptance policy |
|   |   |   | 268 |   |
|   |   |   | . |   |
|   |   |   | . |   |
|   |   |   | . |   |

Hence, the development sample of stage two for this example would consist of all sample points whose profiles have corresponding stage one risk indices in groups II and III. This would comprise approximately 10%+45%=55% of the original development sample.

We would proceed with the development of the second stage of the system, recalculating the percentage of good and bad risks by cell for the known groups at the beginning of Module RCP-X using data from II and III for the good and bad behavior groups to get new risk estimates $\omega_\xi$.

As for the unknown or declined behavior group, we would use data only from III for the unknown counts in RCP-X.

Now we have that:

$$\omega_\psi = \begin{cases} \omega_\theta, & \text{if } \theta \in I \text{ or } \theta \in II \\ \omega_\theta \cdot \omega_\xi, & \text{if } \theta \in III \end{cases}$$

Selected Topics Concerning the Multistage Approach.

I. Effect on acceptance rate calculation

Make the first action table account for say ¼-½ of the approvals. So, if we are aiming for a 55% acceptance rate, have 15-25% of the population approved at stage one (actually this will partially be dictated by a comparison of the individual risk levels with the overall portfolio adds and partially will be a function of the sampled data. We want to make the cutoff odds high enough to ensure significant use of stage two).

Fine tuning could be done on the stage two table(s), i.e., the strategy should be enforced there. Stage one should be set for the life of the system (possibly within 10% bounds, i.e., only individual profiles from group II would be permitted to into group III). Hence, there should be no completely specified strategy associated with the stage one action table. Both of the specified policies will be carried out in the second stage giving two alternative stage two action tables, or sets of stage two action tables, with the same stage one action table in both cases.

II. Applicant Profile Distributions and Acceptee Population Forecasts

For tables accompanying the stage one action table, calculations will be based on data from I, II and III. For those accompanying the second stage action table, calculations will be based on data from III only. Acceptance rates will be calculated accordingly.

III. Applicant Profile Analysis

The scheme previously described for a one stage system discussed above is modified as follows:

Tally the reference numbers for the two-stage system action tables in ordered pairs or in an n×m table (where n, m are the total number of cells in the first and second action tables, respectively) as follows:

Action Table 1\Action Table 2

| Reference No. | 1 | 2 | 3 | ... | m−1 | m | Total |
|---|---|---|---|---|---|---|---|
| 1 | $X_{11}$ | $X_{12}$ | $X_{13}$ | ... | $X_{13m-1}$ | $X_{1m}$ | $X_{1\cdot}$ |
| 2 | $X_{21}$ | $X_{22}$ | $X_{23}$ | ... | $X_{21-1}$ | $X_{2m}$ | $X_{2\cdot}$ |
| 3 | $X_{31}$ | $X_{32}$ | $X_{33}$ | ... | $X_{31m-1}$ | $X_{3m}$ | $X_{3\cdot}$ |
| . | . | . | . | . | . | . | . |
| . | . | . | . | . | . | . | . |
| . | . | . | . | . | . | . | . |
| n−1 | $X_{n-1,1}$ | $X_{n-1,2}$ | $X_{n-1,3}$ | ... | $X_{n-1,m-1}$ | $X_{n-1,m}$ | $X_{n-1\cdot}$ |
| n | $X_{n1}$ | $X_{n2}$ | $X_{n3}$ | ... | $X_{n,m-1}$ | $X_{nm}$ | $X_{n\cdot}$ |
| Total | $X_{\cdot 1}$ | $X_{\cdot 2}$ | $X_{\cdot 3}$ | ... | $X_{\cdot m-1}$ | $X_{\cdot m}$ | $X_{\cdot\cdot}$ |

Where $X_{ij}$'s = tallied counts, $X_{i\cdot} = \sum_{j=1}^{m} X_{ij}$, $X_{\cdot j} = \sum_{i=1}^{n} X_{ij}$ Recognizing that $X_{ij}$=constant for all profiles "i" $\epsilon$ I, we have that part of the tally sheet can be blacked out (entries can be made in the row total (marginal) column).

IV. System Update

A system may have all action table reference numbers stored in the master file regardless of the stage one profile classification. This would allow for system updates where predictors could switch stages in the updated version. If the Client cannot be convinced to store all reference numbers in the master file for model updating, then one may be stored along with a designation as to the action table stage to which it refers. In the event that a single action table reference number is stored and it refers to the very last stage, then a full system update can be performed in the sense that all cell risk indices can be re-estimated. However, in this case, the form of the model remains the same, i.e., the two action tables describes, or represents, the same profiles as before.

Sample Size Determination

If we assume that the data exhibits no severe pathologies, e.g. extreme asymmetry, high percentage of zero cells, etc., then we require only that the expected cell counts be non-zero. It would be desirable to have expected counts of at least two in every cell. For sample sizes of 800 or less, we restrict our selection of multi-way tables to those having 400 or fewer cells. The table below lists the number of distinct consumer profiles, or cells, in a multi-way table given the number of dimensions and the number of strata within each dimension.

There are other considerations aside from the number of cells in the table. These include:

1) Number and type of predictor candidate variables appearing on the application form, 2) Rejection and Bad Rates, plus monthly volume, 3) Client preferences for particular emphasis on specific variables, i.e. many strata, 4) Individual sample sizes among stratified groups, Number of Strata within Each of the Dimensions

| Number of Dimensions | Number of Distinct Profiles | 1 | 2 | 3 | 4 | 5 | 6 | 7 | 8 |
|---|---|---|---|---|---|---|---|---|---|
| 8 | 384 | 2 | 2 | 2 | 2 | 2 | 2 | 2 | 3 |
|   | 256 | 2 | 2 | 2 | 2 | 2 | 2 | 2 | 2 |
| 7 | 320 | 2 | 2 | 2 | 2 | 2 | 2 | 5 |   |
|   | 288 | 2 | 2 | 2 | 2 | 2 | 3 | 3 |   |
|   | 256 | 2 | 2 | 2 | 2 | 2 | 2 | 4 |   |
|   | 192 | 2 | 2 | 2 | 2 | 2 | 2 | 3 |   |
|   | 128 | 2 | 2 | 2 | 2 | 2 | 2 | 2 |   |
| 6 | 288 | 2 | 2 | 2 | 3 | 3 | 4 |   |   |
|   | 256 | 2 | 2 | 2 | 2 | 4 | 4 |   |   |
|   | 216 | 2 | 2 | 2 | 3 | 3 | 3 |   |   |
|   | 192 | 2 | 2 | 2 | 2 | 3 | 4 |   |   |
|   | 144 | 2 | 2 | 2 | 2 | 3 | 3 |   |   |
|   | 128 | 2 | 2 | 2 | 2 | 2 | 4 |   |   |
|   | 96 | 2 | 2 | 2 | 2 | 2 | 3 |   |   |
|   | 64 | 2 | 2 | 2 | 2 | 2 | 2 |   |   |
| 5 | 256 | 2 | 2 | 4 | 4 | 4 |   |   |   |
|   | 243 | 3 | 3 | 3 | 3 | 3 |   |   |   |
|   | 216 | 2 | 3 | 3 | 3 | 4 |   |   |   |
|   | 192 | 2 | 2 | 3 | 4 | 4 |   |   |   |
|   | 162 | 2 | 3 | 3 | 3 | 3 |   |   |   |
|   | 144 | 2 | 2 | 3 | 3 | 4 |   |   |   |
|   | 128 | 2 | 2 | 2 | 4 | 4 |   |   |   |
|   | 108 | 2 | 2 | 3 | 3 | 3 |   |   |   |
|   | 96 | 2 | 2 | 2 | 3 | 4 |   |   |   |
|   | 72 | 2 | 2 | 2 | 3 | 3 |   |   |   |
|   | 64 | 2 | 2 | 2 | 2 | 4 |   |   |   |
|   | 48 | 2 | 2 | 2 | 2 | 3 |   |   |   |
|   | 32 | 2 | 2 | 2 | 2 | 2 |   |   |   |
| 4 | 288 | 2 | 3 | 8 | 6 |   |   |   |   |
|   | 288 | 3 | 4 | 4 | 6 |   |   |   |   |
|   | 256 | 4 | 4 | 4 | 4 |   |   |   |   |
|   | 256 | 2 | 2 | 8 | 8 |   |   |   |   |
|   | 240 | 3 | 4 | 4 | 5 |   |   |   |   |
|   | 216 | 2 | 3 | 6 | 6 |   |   |   |   |
|   | 200 | 2 | 4 | 5 | 5 |   |   |   |   |
|   | 192 | 3 | 4 | 4 | 4 |   |   |   |   |
|   | 192 | 2 | 4 | 4 | 6 |   |   |   |   |
|   | 160 | 2 | 4 | 4 | 5 |   |   |   |   |
|   | 144 | 3 | 3 | 4 | 4 |   |   |   |   |
|   | 128 | 2 | 4 | 4 | 4 |   |   |   |   |
|   | 108 | 3 | 3 | 3 | 4 |   |   |   |   |
|   | 96 | 2 | 3 | 4 | 4 |   |   |   |   |
|   | 81 | 3 | 3 | 3 | 3 |   |   |   |   |
|   | 72 | 2 | 3 | 3 | 4 |   |   |   |   |
|   | 64 | 2 | 2 | 4 | 4 |   |   |   |   |
|   | 54 | 2 | 3 | 3 | 3 |   |   |   |   |
|   | 48 | 2 | 2 | 3 | 4 |   |   |   |   |
|   | 36 | 2 | 2 | 3 | 3 |   |   |   |   |
|   | 32 | 2 | 2 | 2 | 4 |   |   |   |   |
|   | 24 | 2 | 2 | 2 | 3 |   |   |   |   |
|   | 16 | 2 | 2 | 2 | 2 |   |   |   |   |

5) Ease and availability of documents for sampling and coding (plus associated costs and time), 6) Level of significance desired $\alpha$, 7) Sampling design, 8) Non-centrality parameter ($\lambda$) under likely alternatives $H_1$,
   Non-centrality parameter ($\lambda$) for development sample when considering update sample size,
9) Degrees of freedom associated with the model,
10) Desired power ($1-\beta$),
11) The nature and degree of high order interactions in the data (not known a priori-except in the case of update),
12) The number of stages,
13) The number of systems under development.

Item (13) is determined after initial sampling, so that additional sampling may be required.

(When high numbers of sampling zeros do occur, the method discussed with respect to pseudo-Bayes estimation, is used. The algorithm is based on formulas given in Bishop, Frenberg and Holland's *Discrete Multivariate Analysis, Theory and Practice,* ©1975 MIT Press, pp. 401-402.)

Algorithm for Eliminating Sampling Zeros.
1) Use module MEP-X to fit a model "loosely" to the data.
2) Use the fitted values obtained in step 1) i.e. $\{y_{ijklm}\}$ (in the five dimensional case for example) to estimate the prior probabilities $\{\lambda_{ijklm}\}$ via the equation $\lambda_{ijklm}=(y_{ijklm}/n)$ where n=sample size. [In order to make the discussion more general, let "$\theta$" denote a subscript set of arbitrary size—in this example so far $\theta=\{I,j,l,m\}$]
3) Compute the weighting factor:

$$\hat{k} = \frac{n^2 - \sum_\theta X_\theta^2}{\sum_\theta (X_\theta - n\lambda_\theta)^2}$$

($X_\theta$'s are the Observed Counts)
4) Compute the cell estimates:

$$m_\theta^* = np_\theta^* = \frac{n}{n+\hat{k}}(X_\theta + \hat{k}\lambda_\theta)$$

5) Output estimated frequencies as well as cell counts, i.e. both $p_\theta^*$ & $m_\theta^*$.

ECOA Compliance Re: Development-Time Validation
   Procedure can be as follows:
   1) Split development sample of known behavior groups by application date. The most recent 150 (this number may vary depending upon particular circumstances discussed in the previous section on sample size determination) in each behavior group will constitute the hold out sample.
   2) System construction proceeds with the balance of the development sample.
   3) Validation is assessed on the hold out sample and total development sample.
   4) Development-time system update is performed.
   5) Corrected system's performance is assessed on 1) hold out sample, 2) balance development sample, and 3) total or combined development sample.

Via this method, there is no need for additional sampling and ECOA requirements are met.

Classification of a Non-Response to a Question
   Procedure is as follows:
   1) Data is captured as a separate non-response category.
   2) If a significantly large enough group it is retained, unless the client requires that all applications be complete in which case all non-responses are dropped from the analysis (by consequence of the fact that the client sends back incomplete apps, there should be an insignificant number of these).
   3) If the non-response group is small, then we combine it with one of:
      A) Worst Group (intuitively appealing)
      B) Group it behaves the most like (statistically appealing)
      C) Neutral Group (perhaps legally appealing with respect to ECOA), or
      D) Drop from the analysis if client requires complete applications.

A problem may be encountered here if the client has used non-response in the decision process previously, or ignored the issue, but no longer wishes to continue this policy in the future. In such a case we cannot simply drop non-response from the analysis because a large fraction of the development sample may consist of apps. with one or more questions left unanswered. Hence, the system can infer how the applicant would have answered, given their behavior group and other answers. (This is the reverse of the reject inference problem). To solve the problem, we opt for solution 3B) above via characteristic analysis in one dimension along with a check of the parametric form in "N" dimensions to search for the most "similar" response group for the particular question left unanswered. By "similar" we mean similar in terms of behavior or performance, i.e. similar log odds with respect to characteristic analysis and similar interaction parameters as determined by module PEP-X discussed previously.

Credit Approval Example
   As another example of a credit approval application, there are two ways in which a system's effectiveness can diminish. Either the distribution of applicants corresponding to specific profiles changes, or the risk associated with specific profiles changes. In both cases, application of the proper system maintenance techniques will uncover these shifts so that fluctuations in the system's performance can be anticipated, understood. and corrected. A risk evaluation system can provide within such a credit approval application context such advantages as:
1) Specifying interrelationships among variables.
2) Facilitating comparisons of different populations.
3) Increasing the credibility of sample results.
   A) Achieves reductions in sampling variances
   B) Bias reduction.
4) Individual components may be tested for significance.
5) Facilitating model validation and tests of complicated hypotheses at prescribed confidence levels.
6) Having intuitive appeal and being easy to explain to the layperson.
7) Allowing for a statistical assessment of the impact of model predictions on a protected class of individuals (Effects Test).

In this credit approval application, a risk evaluation and policy formulation system allows for the identification of optimal strategies for effectively handling various types of delinquent accounts. Each policy is specified in the form of an action table which functions to enumerate all possible performance profiles along with their associated actions. In addition, the action table assigns a unique reference number to every performance profile for cross-referencing purposes. It is imperative that this number be included in the client's master record for system performance monitoring and updating for a period of four months.

The system uses socio-economic information and individual account purchase and payment history to compute an index indicating the probability that an account will pay its obligations satisfactorily over a given period of time (four months for accounts eight or more months old and three months for recently acquired accounts). Every month at billing time, each account is classified according to a previously determined scheme which associates a percentage likelihood of credit redemption for the particular account's performance profile. All such profiles are identified via their action table reference numbers. This index can be used by a collector in planning his collection approach to an account, by credit personnel in evaluating a credit authorization request or setting credit limits, and by account evaluation programs at renewal time.

The following are examples of performance strata that can be used in this example:
1) current accounts which are over their limit,
2) accounts thirty days past due,
3) accounts sixty days past due,
4) accounts ninety days past due,
5) accounts one hundred twenty or more days part due.

The following are examples of performance descriptor variables:
1) application risk index or credit score,
2) amount over limit,
3) previous high delinquency during the last eight months,
4) number of months current during the last might months,
5) amount of last payment,
6) number of times thirty days past due,
7) number of times sixty days past due,
8) number of times ninety days past due,
9) number of times one hundred twenty or more days past due,
10) percent of balance due to current month's purchases,
11) number of times previously over limit,
12) previous month's status,
13) number of months with zero balance,
14) average balance over the last eight months,
15) average balance over the last four months,
16) amount of average purchase this month,
17) amount of average purchase last month,
18) amount of average purchase during the last eight months,
19) average balance as a percentage of limit,
20) amount of this month's payment,
21) amount of last month's payment,
22) average payment during the last four months,
23) average payment during the last eight months,
24) average payment as a percentage of balance,
25) number of times paid in full,
26) account age in months,
27) maximum previous balance.

For accounts which are eight months or older, the following monthly monitoring report can be produced for each performance stratum beginning four months after system installation:

The same report can be produced for recently established accounts beginning three months after system installation.

System updating (state transition update) focuses on a reassessment of the accuracy of the credit redemption index associated with each delinquent account profile enumerated in an action table. Thus, risk evaluation and policy formulation systems are not bound to a set of initial risk estimates derived during system construction. The time dynamic mechanisms used to interpret individual account behavior are themselves periodically reviewed to ensure acceptable levels of accuracy.

Direct Response Application Example

Situations involving a direct response application can include:
1) New Account Acquisition
2) Inactive Account Stimulation
3) Retail Outlet CO-OP Promotion
4) Solo Direct Mail Merchandising
A) Loans
B) Insurance
C) Goods
D) Services Objective functions that can be used within the risk evaluation system can include:
1) Response
2) Approved Response
3) Higher Purchase Activity
4) Profitability
5) Heighten Consumer Awareness A single or multistage risk evaluation and policy formulation system is constructed for each type of promotion having a specified goal. Given a properly designed test structure, this system will enable the user to isolate specific profiles which characterize the type of individual who is the most desirable to promote. Here the term profile refers to a set of variables associated with an individual which specify all of the information pertinent to the selection process. This set usually includes socioeconomic characteristics obtained from the mailing list along with design variables such as market area, advertising package type, incentive, list source, and so on.

Processing steps can include:
1) Assess Predictive Content of Variables Via a Characteristic Analysis.
2) Build Structural Models for the Populations of Interest.
3) Calculate a Response Index for Each Profile.
4) Profile Analysis of Mail File.
5) Generate Statistical Tables Which Allow for the Formulation of Alternative Marketing Strategies as a Function of the Overall Level of Response to be Required.
6) Build Action Tables.
7) Forecast Response Rates for Population Strata.
8) Generate Percentage Breakdowns of Respondents by Their Profile Components.

| ACTION TABLE REF. NO. | NUMBER OF ACCOUNTS | PERCENT ACCOUNTS ACT. | ACCOUNTS REDEEMED EST.. | | PERFORMANCE INDEX AND STD. ERROR AT ALPHA = .05 LEVEL | | DIFFERENCE INDEX MINUS PCT REDEEMED | STD NMLZ | AT ALPHA LEVEL |
|---|---|---|---|---|---|---|---|---|---|
| | | | | NMBR | PCT | | | | |
| xxx | xxxx | xx.x | xx.x | xxxx | xx | xx | xx.x | xx.x | x.xx | .xxx |

A Multistage System Example

In the application area of credit approval, an applicant who is declined at the first stage proceeds to the next stage for classification and so on. This forward selection process is due in part to the legal requirement that all of the pertinent information furnished by the applicant be considered prior to a decline decision. In contrast, the application area of direct response promotions provides systems which employ forward elimination. For those profiles which are ultimately selected, the decision is not made until the last stage.

Sequential Systems

In the case where we are dealing with multi-objective functions or have a controlled experiment, it will be necessary to develop multiple systems. Consider the following two examples.

Example 1

New Account Acquisition

Two objective functions are specified, namely response and high purchase activity. The first system will isolate profiles corresponding to those individuals who are most likely to respond to the promotion. After a required period of time a second system is developed which will identify those respondents who are most likely to have high purchase activity. Each system associates a response index and activity index, respectively, with every profile. Selection for future mailouts is then based on a function of these two sets of indices.

Example 2

Inactive Account Stimulation

A subset of inactive accounts is promoted. The balance of inactive accounts serve as a control group. Promoted activation is observed along with spontaneous reactivation in the control. First a respond/no respond system is built which isolates respondent profiles and provides their corresponding response indices. Next, using suitable data transformations and multivariate estimation techniques, the extent of spontaneous reactivation in the promoted group is inferred from the control group. A second system is then constructed which forecasts the net response due to the promotion.

Detailed Credit Approval Example

In this detailed credit approval example, a component of a risk evaluation system is an action table which assigns a specific action for each individual applicant profile. Let us consider a one stage, six characteristic system for granting credit at XYZ Department Store. An action table corresponding to one of eighty-four possible policies is shown in Charts I and II below. Accompanying an action table is an applicant profile identification manual which enables operations personnel to find the correct action table entry for an arbitrary credit applicant. (Refer to Charts III. and IV.)

When a credit application is declined, the system identifies and quantifies specific weaknesses in the application and indicates each factor's influence on the decision. (Refer to Charts V-VIII).

Chart IX displays the total percentage of applicants failing within each of eighty-four different risk levels. The column labeled "cells" gives the number of distinct profiles making up each of these eighty-four groups. By summing the table in Chart XIV from bottom-to-top we arrive at the table shown in Chart X.

The reader will note that Chart X is used in the formulation of policies whereby the applicants representing the lowest risk (starting with risk index 320) are taken for a given acceptance rate policy. Each of the eighty-four lines in this table correspond to a distinct action table.

For example, the action table in Charts I and II corresponds to a risk index cutoff of 258 with resulting acceptance rate of approximately fifty-five percent. In this hypothetical case, the credit grantor's previous delinquency experience with a fifty-five percent acceptance rate was a 4.2 percent bad rate. Since the table in Chart X is based on ten thousand applicants we note that the previous number of bad loans made was two hundred thirty-one and this most closely corresponds to a cutoff risk index of 245.

At a risk level of 245, the credit grantor would experience a seventy-five percent acceptance rate while taking the same number of bad loans as before. The action table corresponding to this latter acceptance policy appears in Charts XI and XII.

Assessment of the Impact of a Change in Policy

A risk evaluation and policy formulation system allows for immediate identification of individual profiles affected by a change in approval policy. A table specifying all profiles corresponding to each and every risk level is provided for this purpose, and is displayed in Chart XIII.

For example, a change in policy from risk level 261 to 262 would result in the elimination of one profile from the portfolio, identified by action table reference number 108. Referring to the action table in Chart XI, we see that profile 108 corresponds to an applicant with a checking account, in the low income range, who owns a home, has no major credit card, and has both department store and oil company references.

CHART I

CLIENT NAME: XYZ DEPARTMENT STORE
TYPE OF SYSTEM: CREDIT APPROVAL
PRODUCTION MODULE: SCP-X STEP 6
XYZ DEPARTMENT STORE ACTION TABLE FOR GRANTING CREDIT ACCOUNTS
DEVELOPED BY STATCOMP
STRATEGY: MAINTAIN CURRENT ACCEPTANCE RATE

| BANK REF | MO. INC. | HOUSING | MAJOR CC | OIL CO. DEPT. STR | NONE NONE | NONE ONE-UP | ONE-UP NONE | ONE-UP ONE-UP |
|---|---|---|---|---|---|---|---|---|
| NONE | $0-900 | RENT/OTH | NO | CELL NO. ACTION | 1. DECLINE | 2. DECLINE | 3. DECLINE | 4. DECLINE |
| NONE | $0-900 | RENT/OTH | YES | CELL NO. ACTION | 5. DECLINE | 6. DECLINE | 7. DECLINE | 8. DECLINE |
| NONE | $0-900 | OWN/BUY | NO | CELL NO. ACTION | 9. DECLINE | 10. DECLINE | 11. DECLINE | 12. DECLINE |

CHART I-continued

CLIENT NAME: XYZ DEPARTMENT STORE
TYPE OF SYSTEM: CREDIT APPROVAL
PRODUCTION MODULE: SCP-X STEP 6
XYZ DEPARTMENT STORE ACTION TABLE FOR GRANTING CREDIT ACCOUNTS
DEVELOPED BY STATCOMP
STRATEGY: MAINTAIN CURRENT ACCEPTANCE RATE

| BANK REF | MO. INC. | HOUSING | MAJOR CC | OIL CO. DEPT. STR | NONE NONE | NONE ONE-UP | ONE-UP NONE | ONE-UP ONE-UP |
|---|---|---|---|---|---|---|---|---|
| NONE | $0-900 | OWN/BUY | YES | CELL NO. ACTION | 13. DECLINE | 14. DECLINE | 15. DECLINE | 16. DECLINE |
| NONE | 901-1499 | RENT/OTH | NO | CELL NO. ACTION | 17. DECLINE | 18. DECLINE | 19. DECLINE | 20. DECLINE |
| NONE | 901-1499 | RENT/OTH | YES | CELL NO. ACTION | 21. DECLINE | 22. DECLINE | 23. APPROVE | 24. APPROVE |
| NONE | 901-1499 | OWN/BUY | NO | CELL NO. ACTION | 25. DECLINE | 26. DECLINE | 27. DECLINE | 28. DECLINE |
| NONE | 901-1499 | OWN/BUY | YES | CELL NO. ACTION | 29. DECLINE | 30. DECLINE | 31. APPROVE | 32. APPROVE |
| NONE | $1500-UP | RENT/OTH | NO | CELL NO. ACTION | 33. DECLINE | 34. DECLINE | 35. DECLINE | 36. DECLINE |
| NONE | $1500-UP | RENT/OTH | YES | CELL NO. ACTION | 37. APPROVE | 38. APPROVE | 39. APPROVE | 40. APPROVE |
| NONE | $1500-UP | OWN/BUY | NO | CELL NO. ACTION | 41. DECLINE | 42. DECLINE | 43. DECLINE | 44. DECLINE |
| NONE | $1500-UP | OWN/BUY | YES | CELL NO. ACTION | 45. APPROVE | 46. APPROVE | 47. APPROVE | 48. APPROVE |
| SAVE | $0-900 | RENT/OTH | NO | CELL NO. ACTION | 49. DECLINE | 50. DECLINE | 51. DECLINE | 52. DECLINE |
| SAVE | $0-900 | RENT/OTH | YES | CELL NO. ACTION | 53. DECLINE | 54. DECLINE | 55. DECLINE | 56. APPROVE |
| SAVE | $0-900 | OWN/BUY | NO | CELL NO. ACTION | 57. DECLINE | 58. DECLINE | 59. DECLINE | 60. APPROVE |
| SAVE | $0-900 | OWN/BUY | YES | CELL NO. ACTION | 61. APPROVE | 62. APPROVE | 63. APPROVE | 64. APPROVE |
| SAVE | 901-1499 | RENT/OTH | NO | CELL NO. ACTION | 65. DECLINE | 66. DECLINE | 67. DECLINE | 68. DECLINE |
| SAVE | 901-1499 | RENT/OTH | YES | CELL NO. ACTION | 69. DECLINE | 70. DECLINE | 71. APPROVE | 72. APPROVE |
| SAVE | 901-1499 | OWN/BUY | NO | CELL NO. ACTION | 73. DECLINE | 74. DECLINE | 75. APPROVE | 76. APPROVE |
| SAVE | 901-1499 | OWN/BUY | YES | CELL NO. ACTION | 77. APPROVE | 78. APPROVE | 79. APPROVE | 80. APPROVE |
| SAVE | $1500-UP | RENT/OTH | NO | CELL NO. ACTION | 81. DECLINE | 82. DECLINE | 83. DECLINE | 84. DECLINE |
| SAVE | $1500-UP | RENT/OTH | YES | CELL NO. ACTION | 85. DECLINE | 86. DECLINE | 87. APPROVE | 88. APPROVE |
| SAVE | $1500-UP | OWN/BUY | NO | CELL NO. ACTION | 89. DECLINE | 90. DECLINE | 91. APPROVE | 92. APPROVE |
| SAVE | $1500-UP | OWN/BUY | YES | CELL NO. ACTION | 93. APPROVE | 94. APPROVE | 95. APPROVE | 96. APPROVE |

CHART II

CLIENT NAME: XYZ DEPARTMENT STORE
TYPE OF SYSTEM: CREDIT APPROVAL
PRODUCTION MODULE: SCP-X STEP 6
XYZ DEPARTMENT STORE ACTION TABLE FOR GRANTING CREDIT ACCOUNTS
DEVELOPED BY STATCOMP
STRATEGY: MAINTAIN CURRENT ACCEPTANCE RATE

| BANK REF | MO. INC. | HOUSING | MAJOR CC | OIL CO. DEPT. STR | NONE NONE | NONE ONE-UP | ONE-UP NONE | ONE-UP ONE-UP |
|---|---|---|---|---|---|---|---|---|
| CHECK | $0-900 | RENT/OTH | NO | CELL NO. ACTION | 97. DECLINE | 98. DECLINE | 99. DECLINE | 100. DECLINE |
| CHECK | $0-900 | RENT/OTH | YES | CELL NO. ACTION | 101. APPROVE | 102. APPROVE | 103. APPROVE | 104. APPROVE |
| CHECK | $0-900 | OWN/BUY | NO | CELL NO. ACTION | 105. DECLINE | 106. DECLINE | 107. DECLINE | 108. APPROVE |
| CHECK | $0-900 | OWN/BUY | YES | CELL NO. ACTION | 109. APPROVE | 110. APPROVE | 111. APPROVE | 112. APPROVE |
| CHECK | 901-1499 | RENT/OTH | NO | CELL NO. ACTION | 113. DECLINE | 114. DECLINE | 115. DECLINE | 116. APPROVE |

CHART II-continued

CLIENT NAME: XYZ DEPARTMENT STORE
TYPE OF SYSTEM: CREDIT APPROVAL
PRODUCTION MODULE: SCP-X STEP 6
XYZ DEPARTMENT STORE ACTION TABLE FOR GRANTING CREDIT ACCOUNTS
DEVELOPED BY STATCOMP
STRATEGY: MAINTAIN CURRENT ACCEPTANCE RATE

| BANK REF | MO. INC. | HOUSING | MAJOR CC | OIL CO. DEPT. STR | NONE NONE | NONE ONE-UP | ONE-UP NONE | ONE-UP ONE-UP |
|---|---|---|---|---|---|---|---|---|
| CHECK | 901-1499 | RENT/OTH | YES | CELL NO. ACTION | 117. APPROVE | 118. APPROVE | 119. APPROVE | 120. APPROVE |
| CHECK | 901-1499 | OWN/BUY | NO | CELL NO. ACTION | 121. DECLINE | 122. APPROVE | 123. APPROVE | 124. APPROVE |
| CHECK | 901-1499 | OWN/BUY | YES | CELL NO. ACTION | 125. APPROVE | 126. APPROVE | 127. APPROVE | 128. APPROVE |
| CHECK | $1500-UP | RENT/OTH | NO | CELL NO. ACTION | 129. DECLINE | 130. DECLINE | 131. DECLINE | 132. APPROVE |
| CHECK | $1500-UP | RENT/OTH | YES | CELL NO. ACTION | 133. APPROVE | 134. APPROVE | 135. APPROVE | 136. APPROVE |
| CHECK | $1500-UP | OWN/BUY | NO | CELL NO. ACTION | 137. APPROVE | 138. APPROVE | 139. APPROVE | 140. APPROVE |
| CHECK | $1500-UP | OWN/BUY | YES | CELL NO. ACTION | 141. APPROVE | 142. APPROVE | 143. APPROVE | 144. APPROVE |
| BOTH | $0-900 | RENT/OTH | NO | CELL NO. ACTION | 145. DECLINE | 146. DECLINE | 147. DECLINE | 148. APPROVE |
| BOTH | $0-900 | RENT/OTH | YES | CELL NO. ACTION | 149. APPROVE | 150. APPROVE | 151. APPROVE | 152. APPROVE |
| BOTH | $0-900 | OWN/BUY | NO | CELL NO. ACTION | 153. DECLINE | 154. APPROVE | 155. APPROVE | 156. APPROVE |
| BOTH | $0-900 | OWN/BUY | YES | CELL NO. ACTION | 157. APPROVE | 158. APPROVE | 159. APPROVE | 160. APPROVE |
| BOTH | 901-1499 | RENT/OTH | NO | CELL NO. ACTION | 161. DECLINE | 162. DECLINE | 163. DECLINE | 164. APPROVE |
| BOTH | 901-1499 | RENT/OTH | YES | CELL NO. ACTION | 165. APPROVE | 166. APPROVE | 167. APPROVE | 168. APPROVE |
| BOTH | 901-1499 | OWN/BUY | NO | CELL NO. ACTION | 169. DECLINE | 170. APPROVE | 171. APPROVE | 172. APPROVE |
| BOTH | 901-1499 | OWN/BUY | YES | CELL NO. ACTION | 173. APPROVE | 174. APPROVE | 175. APPROVE | 176. APPROVE |
| BOTH | $1500-UP | RENT/OTH | NO | CELL NO. ACTION | 177. DECLINE | 178. DECLINE | 179. APPROVE | 180. APPROVE |
| BOTH | $1500-UP | RENT/OTH | YES | CELL NO. ACTION | 181. APPROVE | 182. APPROVE | 183. APPROVE | 184. APPROVE |
| BOTH | $1500-UP | OWN/BUY | NO | CELL NO. ACTION | 185. APPROVE | 186. APPROVE | 187. APPROVE | 188. APPROVE |
| BOTH | $1500-UP | OWN/BUY | YES | CELL NO. ACTION | 189. APPROVE | 190. APPROVE | 191. APPROVE | 192. APPROVE |

Chart III

XYZ Department Store Credit Approval System

Action Table Reference Manual

THIS MANUAL IS INTENDED TO SERVE AS A GUIDE TO THE IDENTIFICATION OF THE INDIVIDUAL APPLICANT'S CLASSIFICATION ACCORDING TO EACH CATEGORY MAKING UP THE ACTION TABLE. THE INSTRUCTIONS WHIM FOLLOW SHOULD BE SUFFICIENT TO ENABLE THE USER TO FIND THE CORRECT ACTION TABLE CELL CORRESPONDING TO ANY ARBITRARY CREDIT APPLICATION

Financial Institution Reference

A checking account may be with a bank, a savings and loan company, trust company, or credit union. It may be either a personal or joint account. Similarly, a savings account may be with a bank, savings and loan company, trust company, credit union, or finance company. Savings accounts include Certificates of Deposit and Christmas Clubs. The savings account is in the applicant's name or a joint account and is an open account. Checking and savings accounts need not be with' the same financial institutions.

| NONE | No checking account or savings account is Shown on the application. |
| SAVE | The applicant indicates that he/she has a savings account. No checking account is shown. |
| CHECK | The applicant indicates a checking account, but no savings account is listed. |
| BOTH | The applicant shows' both checking and savings accounts. |

Monthly Income

This refers to the total gross monthly income of the family. This includes the applicant's salary, co-applicant's salary and all additional income received from part-time work, second jobs, rentals, social security, pensions, alimony, welfare, child support, etc.

If hourly, weekly, or yearly amounts are given, convert all income to a gross monthly amount as indicated below:
    If an hourly rate is given, multiply by 173 hours/month
    If a weekly rate is given, multiply by 4.3 weeks/month If a yearly rate is given, divide by 12 months/year If net income is given, multiply by 1.3 (income amounts are assumed to be gross unless stated to be net)

$0-900 Refers to all applicants having a total gross monthly income of $900 or less.

$901-1499 Refers to applicants having a total gross monthly income ranging from $901 to $1499.

$1500-UP Refers those applicants having a total gross monthly income of $1500 or more.

Housing

Identify the applicant's current residential' status as shown on the application. If the applicant is renting at the present address, but owns elsewhere, classify him/her as a renter.

Chart IV

OWN/BUY Refers to an applicant who owns or is buying the house or condominium shown as the current residence.

RENT/OTH Refers to an applicant who rents the house, apartment, or condominium shown as the current residence. Also refers to an applicant whose residential status includes 1) living with parents or relatives, 2) students living in college housing, 3) military personnel living on base, 4) living quarters furnished by employer, 5) mobile homes.

Major Credit Card Reference

NONE Refers to an applicant who fails to list any major credit card references in the credit reference section of the application.

ONE-UP Refers to an applicant who gives one or more major credit card references in the credit reference section. Account numbers are listed in order for the reference to count. A partial list of some of the major credit cards currently in use is as follows: Access Card, Airline Credit Card, American Express Card, any Bank Credit Card, BankAmericard, Barclay Card, CAP Card, Carte Blanche Card, Chargex, Diners Club Card, Empire Card, Master Charge Card, NAC Card, TWA Getaway Card, Visa Card. Do not limit to this list.

Do not include telephone charge cards, car rental charge cards, oil company charge cards, or check guarantee cards.

Oil Company Reference

NONE Refers to an applicant who fails to list any oil company accounts in the credit reference section of the application.

ONE-UP Refers to an applicant who gives one or more oil company accounts in the credit reference section. Account numbers are supplied in order for the reference to count. A partial list of oil companies is as follows: American Oil (AMOCO), Ashland Petroleum, (APCO), Atlantic' Richfield (ARCO) Beacon Oil, Boron, British Petroleum, Chevron Oil, Cities Service (Citgo), Clark Oil, CONOCO, Continental Oil, Crown, ENCO, ESSO, EXXON, Getty Oil, Gulf Oil, Hancock, Hudson, Humble, Husky, Imperial, Mobil Oil, Mohawk, Phillips 66, Shamrock, Shell Oil, Sinclair, Shell Oil, Sohio, Standard Oil, Sun Oil (SUNOCO), Tenneco Oil, Texaco, Tidewater, Union Oil, Wilshire, Zephyr. Do not limit to this list. Also include oil company travel and entertainment cards such as Chevron Travel Card, Torch (Standard Oil of Indiana), etc.

Department Store Reference

NONE No department store accounts listed in the credit reference section of the application.

ONE-UP One or more department store accounts listed in the credit reference section. Account numbers are present in order for the reference to be valid. A list of department stores (alphabetically ordered) is attached. LIMIT TO THIS LIST.

CHART V

CLIENT NAME: XYZ DEPARTMENT STORE
TYPE OF SYSTEM: CREDIT APPROVAL
PRODUCTION MODULE: RCP-X STEP 6
THE FOLLOWING TABLE GIVES THE MAXIMUM IMPROVEMENT IN RISK LEVEL TO BE ACHIEVED BY A CHANGE IN ANY ONE OF THE FOUR MOST IMPORTANT FACTORS INDICATED FOR ALL APPLICANT PROFILES CORRESPONDING TO DECLINE CELLS IN THE ACTION TABLE. ALSO INCLUDED IN THE TABLE ARE THE NEW ACTIONS WHICH WOULD RESULT IF EACH OF THE FOUR POSSIBLE CHANGES WERE TO HAVE OCCURRED INDIVIDUALLY.

| ACTION TABLE REF. NO. | FACTOR 1 NET GAIN RESULT | FACTOR 2 NET GAIN RESULT | FACTOR 3 NET GAIN RESULT | FACTOR 4 NET GAIN RESULT |
|---|---|---|---|---|
| 1 | MAJOR CC 47. DECLINE | BANK REF 30. DECLINE | OIL CO. 21. DECLINE | MO. INC. 18. DECLINE |
| 2 | MAJOR CC 40. DECLINE | BANK REF 34. DECLINE | OIL CO. 23. DECLINE | MO. INC. 16. DECLINE |
| 3 | MAJOR CC 28. DECLINE | BANK REF 19. DECLINE | MO. INC. 19. DECLINE | DEPT. STR 9. DECLINE |
| 4 | BANK REF 26. APPROVE | MAJOR CC 21. DECLINE | MO. INC. 18. DECLINE | HOUSING 4. DECLINE |
| 5 | BANK REF 38. APPROVE | MO. INC. 13. APPROVE | OIL CO. 3. DECLINE | HOUSING 2. DECLINE |
| ... | | | | |
| 145 | MAJOR CC 57. APPROVE | HOUSING 17. DECLINE | DEPT. STR 15 DECLINE | OIL CO. 13. DECLINE |
| 146 | MAJOR CC 51. APPROVE | HOUSING 14. APPROVE | OIL CO. 14. APPROVE | MO. INC. 12. DECLINE |
| 147 | MAJOR CC 59. APPROVE | HOUSING 16. APPROVE | DEPT. STR 16. APPROVE | MO. INC. 15. APPROVE |
| 153 | MAJOR CC 53. APPROVE | MO. INC. 19. APPROVE | OIL CO. 13. APPROVE | DEPT. STR 13. APPROVE |
| 161 | MAJOR CC 54. APPROVE | HOUSING 18 DECLINE | OIL CO. 16. DECLINE | DEPT. STR 14. DECLINE |
| 162 | MAJOR CC 47. APPROVE | OIL CO. 17. APPROVE | HOUSING 16. APPROVE | MO. INC. 5. DECLINE |
| 163 | MAJOR CC 35. APPROVE | HOUSING 18. APPROVE | DEPT. STR 15. APPROVE | MO. INC. 5. APPROVE |
| 169 | MAJOR CC 49. APPROVE | OIL CO. 16. APPROVE | DEPT. STR 12. APPROVE | MO. INC. 10. APPROVE |
| 177 | MAJOR CC 53. APPROVE | HOUSING 22. APPROVE | OIL CO. 15. APPROVE | DEPT. STR 14. DECLINE |
| 178 | MAJOR CC 46. APPROVE | HOUSING 20. APPROVE | OIL CO. 16. APPROVE | DEPT. STR 0. DECLINE |

CHART IX

CLIENT NAME: XYZ DEPARTMENT STORE
TYPE OF SYSTEM: CREDIT APPROVAL
PRODUCTION MODULE: RCP-X STEP 5
XYZ DEPARTMENT STORE RISK EVALUATION SYSTEM
RISK INDEX DENSITY FUNCTIONS

| RISK INDEX | GOOD NUMBR | PCNT | BAD NMBR | PCNT | TOTAL NMBR | PCNT | ODDS | CELLS |
|---|---|---|---|---|---|---|---|---|
| 203 | 71. | 0.8 | 61. | 8.1 | 132. | 1.3 | 1.2 | 1 |
| 209 | 50. | 0.5 | 32. | 4.2 | 82. | 0.8 | 1.6 | 1 |
| 211 | 114. | 1.2 | 66. | 8.8 | 181. | 1.8 | 1.7 | 2 |
| 215 | 25. | 0.3 | 13. | 1.7 | 41. | 0.4 | 2.1 | 1 |
| 218 | 91. | 1.0 | 37. | 4.9 | 128. | 1.3 | 2.5 | 2 |
| 220 | 61. | 0.7 | 22. | 2.9 | 83. | 0.8 | 2.8 | 1 |
| 222 | 68. | 0.7 | 23. | 3.1 | 91. | 0.9 | 2.9 | 1 |
| 224 | 44. | 0.5 | 13. | 1.8 | 57. | 0.6 | 3.3 | 2 |
| 226 | 106. | 1.1 | 29. | 3.8 | 135. | 1.4 | 3.7 | 2 |
| 228 | 35. | 0.4 | 9. | 1.2 | 43. | 0.4 | 4.0 | 1 |

CHART XI

CLIENT NAME: XYZ DEPARTMENT STORE
TYPE OF SYSTEM: CREDIT APPROVAL
PRODUCTION MODULE: RCP-X STEP 6
XYZ DEPARTMENT STORE ACTION TABLE FOR GRANTING CREDIT ACCOUNTS
DEVELOPED BY STATCOMP
STRATEGY: MAINTAIN CURRENT BAD DEBT RATE

| BANK REF | MO. INC. | HOUSING | MAJOR CC | OIL CO. DEPT. STR | NONE NONE | NONE ONE-UP | ONE-UP NONE | ONE-UP ONE-UP |
|---|---|---|---|---|---|---|---|---|
| NONE | $0-900 | RENT/OTH | NO | CELL NO. ACTION | 1. DECLINE | 2. DECLINE | 3. DECLINE | 4. DECLINE |
| NONE | $0-900 | RENT/OTH | YES | CELL NO. ACTION | 5. APPROVE | 6. APPROVE | 7. APPROVE | 8. APPROVE |
| NONE | $0-900 | OWN/BUY | NO | CELL NO. ACTION | 9. DECLINE | 10. DECLINE | 11. DECLINE | 12. DECLINE |
| NONE | $0-900 | OWN/BUY | YES | CELL NO. ACTION | 13. APPROVE | 14. APPROVE | 15. APPROVE | 16. APPROVE |
| NONE | 901-1499 | RENT/OTH | NO | CELL NO. ACTION | 17. DECLINE | 18. DECLINE | 19. DECLINE | 20. DECLINE |
| NONE | 901-1499 | RENT/OTH | YES | CELL NO. ACTION | 21. APPROVE | 22. APPROVE | 23. APPROVE | 24. APPROVE |
| NONE | 901-1499 | OWN/BUY | NO | CELL NO. ACTION | 25. DECLINE | 26. DECLINE | 27. DECLINE | 28. APPROVE |
| NONE | 901-1499 | OWN/BUY | YES | CELL NO. ACTION | 29. APPROVE | 30. APPROVE | 31. APPROVE | 32. APPROVE |
| NONE | $1500-UP | RENT/OTH | NO | CELL NO. ACTION | 33. DECLINE | 34. DECLINE | 35. DECLINE | 36. APPROVE |

CHART XIII

CLIENT NAME: XYZ DEPARTMENT STORE
TYPE OF SYSTEM: CREDIT APPROVAL
PRODUCTION MODULE: RCP-X STEP 5
REFERENCE TABLE ENUMERATING ALL CELLS
WHICH CORRESPOND TO EACH RISK LEVEL

| INDEX | NUMBER | CORRESPONDING CELL ADDRESSES (SORTED INTO INCREASING ORDER) | | |
|---|---|---|---|---|
| 203 | 1 | 1 | | |
| 209 | 1 | 9 | | |
| 211 | 2 | 2 | 17 | |
| 215 | 1 | 10 | | |
| 218 | 2 | 15 | 25 | |
| 220 | 1 | 33 | | |
| 222 | 1 | 49 | | |
| 224 | 2 | 3 | 26 | |
| 226 | 2 | 65 | 81 | |
| 228 | 1 | 34 | | |
| 230 | 2 | 11 | 30 | |
| 231 | 1 | 145 | | |
| 232 | 2 | 41 | 97 | |
| 233 | 1 | 82 | | |
| 234 | 2 | 4 | 66 | |
| 235 | 2 | 19 | 37 | |
| 237 | 1 | 42 | | |
| 238 | 3 | 12 | 99 | 161 |
| 240 | 1 | 113 | | |
| 241 | 3 | 51 | 58 | 73 |

CHART XIII-continued

CLIENT NAME: XYZ DEPARTMENT STORE
TYPE OF SYSTEM: CREDIT APPROVAL
PRODUCTION MODULE: RCP-X STEP 5
REFERENCE TABLE ENUMERATING ALL CELLS
WHICH CORRESPOND TO EACH RISK LEVEL

| INDEX | NUMBER | CORRESPONDING CELL ADDRESSES (SORTED INTO INCREASING ORDER) | | | | | | |
|---|---|---|---|---|---|---|---|---|
| 242 | 1 | 27 | | | | | | |
| 243 | 1 | 95 | | | | | | |
| 244 | 5 | 20 | 35 | 129 | 147 | 177 | | |
| 245 | 2 | 39 | 105 | | | | | |
| 246 | 2 | 74 | 145 | | | | | |
| 247 | 2 | 83 | 133 | | | | | |
| 248 | 2 | 67 | 115 | | | | | |
| 249 | 1 | 25 | | | | | | |
| 250 | 5 | 3 | 52 | 90 | 100 | 114 | | |
| 251 | 4 | 6 | 13 | 14 | 107 | | | |
| 252 | 4 | 7 | 36 | 131 | 162 | | | |
| 254 | 7 | 15 | 21 | 39 | 106 | 121 | 130 | 163 |
| 255 | 7 | 3 | 16 | 22 | 43 | 53 | 84 | 85 |
| 256 | 4 | 30 | 55 | 86 | 169 | | | |
| 257 | 6 | 29 | 54 | 68 | 69 | 70 | 178 | |
| 258 | 1 | 57 | | | | | | |

While examples have been used to disclose the invention, including the best mode, and also to enable any person skilled in the art to make and use the invention, the patentable scope of the invention is defined by claims, and may include other examples that occur to those skilled in the art. For example, it should be understood that the steps and the order of the steps in the flowcharts and other process flows described herein may be altered, deleted, modified and/or augmented and still achieve the desired outcome.

As another example, the systems and methods disclosed herein may be configured in a number of different ways. As illustrations, a risk evaluation system can be configured to have one or more of the following characteristics:

1. Simplicity of the end product.

Action tables provide the approval decision without the need of adding up numbers as scoring system users are required to do. This results in one or more of the following benefits:

A) Lower operating costs due to more rapid processing;

B) Elimination of erroneous decisions due to arithmetic errors; and

C) Elimination of score fudging where, in a scoring system environment, scorers may tend to add a few points to the applicant's final score if he is close to the numerical cutoff in order to grant an approval when the scorer disagrees with the system.

2. Accuracy.

A) Unique risk equations are derived for every applicant profile (action table cell) which provides more accurate estimates of creditworthiness than those obtained using other methods.

B) The risk evaluation system allows for a more accurate comparison of sampled populations by viewing the discrimination problem within the context of multidimensional contingency-table analysis. Using this approach, entire distributions are compared simultaneously over a multidimensional lattice of applicant profiles rather than resorting to the use of (and relying upon) a measure of separation which amounts to no more than a simple algebraic function of a couple of parameters from each of the two distributions (e.g. Fair Isaac and Co. measures the distance between two-distributions by the formula:

$$\frac{(\mu_G - \mu_B)^2}{\frac{1}{2}(\sigma_G + \sigma_B)}$$

where $\mu_G$ and $\mu_B$ are the respective means of the score distribution for the good and bad risk groups and $\sigma_G$ and $\sigma_B$ are the corresponding standard deviations).

3. Elimination of normality assumption and equal variance assumption.

Scoring system developers ignore violation of these assumptions as they know of no good solution to these problems. Because the fundamental nature of the approach embodied in the risk evaluation system differs radically from other methods used by scoring system developers, these assumptions are not required. Hence, models formulated during the risk evaluation process do not suffer the adverse affects which are incumbent with violated assumptions.

4. Smaller sample sizes are required for system development under the risk evaluation system.

This fact is due both to the methods of estimation employed during the risk evaluation system as well as the multistage approach towards system construction.

5. The risk evaluation system produces multidimensional acceptance rates for an approval policy whereas scoring systems provide only one dimensional acceptance rates.

6. The risk evaluation system produces percentage distribution forecasts for the applicant population by their profile components, and all combinations thereof, while other processes produce only a single forecast of the applicant score distribution. Thus, the risk evaluation system provides more detailed and exact estimates of the distribution of applicants by each individual profile than a scoring system which maps many different profiles to the same score (when their risk levels are the same) so that all information leading back to specific profiles is lost.

7. The risk evaluation system also provides a multidimensional analysis of the acceptee population mix which is not possible when other development processes are used.

8. Credit system compliance with Regulation B of the Equal Credit Opportunity Act.

A) The risk evaluation system produces credit approval systems which possess a table which enumerates four decline reasons for all decline cells in the action table. For each cell, the four reasons are ranked in order of importance and both the change (improvement) in risk to be obtained by the last response in each category as well as the resulting new decision is given. Scoring system users cannot supply accurately specific reasons for decline as they resort to looking at point differences on the scorecard to approximate the reasons for an applicant not making the numerical cutoff.

B) Effects Test. A scorecard development process is vulnerable to bias. This is true because ECOA Section 202.2(p)(1) that provides the standard for an empirically derived, demonstrably statistically sound (EDDSS) scorecard does not delve into the level of specificity around scoring system development to adequately address choice of model variables Scoring system developers openly admit to multiple optimal scorecards. It follows that no two of them will leave the same protected class invariant when scored out, i.e., significantly different acceptance rates will result from two different scorecards for the protected class in question. It turns out that the order in which variables are allowed to come into the predictor set has a great deal to do with how much weight is put on each factor. Since different factors have a different impact on protected classes, this implies that scorecards suffer from two main fair treatment drawbacks associated with the path-dependency of their final point score values, namely:

1. There are a large number of alternative scorecards that possess different characteristics which have equal good/bad predictive power, while treating the protected class more favorably than the scorecard adopted by the institution
2. There exist alternative scorecards that possess identical characteristics as the scorecard currently in use by the institution, but which have different point values and different relative importance of the model factors, and which exhibit comparable good/bad predictive power, while treating the protected class more favorably than the scorecard adopted by the institution.

In contrast, the risk evaluation process constructs a risk evaluation and policy formulation system which affords a choice of a specific policy for approval which is stated explicitly and exhaustively via an action table. Thus, the impact of any specific approval policy on a protected class of individuals can be easily quantified and, if need be, corrected if the situation warrants such action. This task can be accomplished via a profile analysis of the protected sub-population, followed by an analysis of the decline factors associated with decline cells exhibiting high incidence among the sub-population of interest.

9. Better Public Relations due to logical approval criteria. The policy embodied in an action table is logically based on historical repayment rates for each individual profile. Scoring systems, on the other hand, often exhibit irrational looking point criteria which puts them in an unfavorable light with respect to the public who are judged by the illogical criteria.

10. The final product from the risk evaluation system allows for immediate identification of individual profiles affected by a change in approval policy. A table specifying all profiles corresponding to each and every risk level is provided for this purpose. Scoring systems, on the other hand, cannot identify specific profiles affected by a change in policy. Hence, when a scoring system user changes the numerical cutoff, he does not know which profiles he has affected.

11. Applicant Profile Analysis.

Significant shifts in the structure of the applicant population with respect to any individual profile or group of profiles can be detected early on via this analysis so that changes in the systems performance can be anticipated, understood, and corrected. All that is required is a tally of the number of applicants corresponding to each individual cell in the action table. The profiles are identified easily by their action table reference numbers. The new totals are added to the development sample (or census) counts in every cell and the percentage of applicants is re-calculated for every action table cell (distinct applicant profile). This technique is far more powerful than the corresponding early warning measures employed by scoring system users to explain shifts in score distribution as they relate to various sub-strata in the applicant population.

12. System Updating.

Systems developed by the risk evaluation process are easier to update than scoring systems. Because of estimation procedures used during the risk evaluation process, updates can also be made more frequently than for scoring systems.

System updating focuses on a re-examination of the degree of risk that the system associates with various applicant profiles specified in the action table. A performance audit is carried out on the client's customer master file for all accounts opened since the date of system installation. Provided that the appropriate action table reference numbers are maintained on this file, there is no need for re-sampling as is the case with scoring system validation studies. The number of good, bad, and indeterminate loans that fall outside of any exclusion criteria can simply be tallied for each action table reference number. Results from this audit are analyzed to determine whether or not the overall distribution of newly acquired good and bad customers is significantly different from that of the previously sampled good and bad customers. Finally, appropriate adjustments are made so as to ensure accurate risk estimates for those profiles which are affected. This final step is not possible with a scoring system, as point values on the scorecard cannot be updated. Hence, with a scoring system, if an update is indicated, the developer undertakes to reconstruct an entirely new scoring system at a substantial cost to the system user in terms of both time and money. Furthermore, scoring system developers re-sample because they cannot retrieve applicant profiles from the score on a customer master file as is possible with action table reference numbers.

13. The two previous items in this section (namely items 11 and 12) provide the means whereby a risk evaluation system can, with historical data used as a starting solution, adapt over time in a non-stationary environment. There are two ways that a system can diminish in effectiveness, namely: 1) the distribution of applicants corresponding to specific profiles changes, or 2) the risk associated with specific profile changes. By way of the above referred to items, these time varying parameters are adjusted as additional information becomes available. In contrast, scoring systems represent static models in a constantly changing environment. From the very time of scoring system installation, the signal to noise ratio decreases over time until the system finally self-destructs. Consequently, the accuracy of decisions made by a scoring system diminishes steadily over time. It should also be noted that both the applicant distribution and the degree of risk, relative to the cells in an action table, may alternatively be forecast using any method desired and the results can be incorporated into the action table to simulate the impact on individual risk profiles and to test different policy formulations in order to determine how to achieve any of a number of different stated objectives (e.g. maximize revenue, minimize credit losses, maintain an acceptance rate, increase overall market share by ten percent, increase a particular product's share by twenty percent, etc.) or to optimize profitable portfolio growth, or marketing campaigns, in general. Furthermore, the assumptions underlying a particular forecast may be linked directly, or indirectly, to a single, or multi-stage, action table by including the discrete analog (e.g. a variable based on specific ranges of values) of one or more forecasting model variables as one, or more, dimensions in the action table. In this way the action table may include cells that are based upon risk profiles determined by the individual applicant, borrower, or customer, and also by assumptions relative to one or more factors relative to corporate, economic, market, collateral, or other business-related conditions.

14. In a broader sense, the information components of an action table cell may be expanded to include all of the elements of a profit and loss statement, plus other operating statistics, for the associated segment of customers, borrowers, or applicants. Rate of attrition, propensity to buy, 30-60-90 day delinquency rates, average age of account, average remaining term on closed-end loan, average credit line utilization on an open-ended loan, gross credit loss rate, recovery rate, overlimit rate, single pay default rate, rate of fraudulent transactions, average annual fraud dollar charge-off, response rate to various types of promotional offers, average cross-selling rate for one or more products, average annual dollars of revenue generated, average annual dollars of finance charges paid, annual profit per account, etc. are examples of measures that can be captured and utilized in the action table framework. Optimization of policies embodied in an action table to achieve a stated objective, or possibly multiple objectives, can be accomplished by simulation and experimentation with different policy modification schemes under varying assumptions, or by deploying optimization methods directly. Direct application of optimization via a linear programming approach includes the formulation of the pertinent action table cell components as an activity n-tuple (subscripted variable), formulation of the policy objective as a function of the activity variables, with associated objective function coefficients, the specification of risk constraints based upon the cell risk index functions, and specification of bounds on marginal totals and values in the rows of the single, or multi-stage, action table that constitute the right-hand side values of the set of linear constraints. For more complex policy optimization problems, simultaneous objective functions (including hierarchical subordinate objectives) may be specified and the optimization problem may be solved using goal programming and other techniques that are commonplace in the field of operations research.

It is further noted that the systems and methods disclosed herein may be implemented on various types of computer architectures, such as for example on a single general purpose computer or workstation, or on a networked system, or in a client-server configuration, or in an application service provider configuration.

It is further noted that the systems and methods may include data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform methods described herein. Other implementations may also be used, however, such as firmware or even appropriately designed hardware configured to carry out the methods and systems described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

It is claimed:

1. A computer-implemented system for evaluating risks associated with alternative strategies for assessing an entity with respect to a predetermined objective, comprising:
   an action table;
   wherein the action table contains a plurality of possible actions that can be taken with respect to the predetermined objective for various entity profiles;
   wherein the action table contains an action for each entity profile; one or more statistical data stores that are configured to contain risk amounts associated with each entity profile;
   wherein the one or more statistical data stores are configured to contain inferred percentage distribution of applicants associated with each entity profile;
   one or more profile identification data stores;
   wherein a profile identification data store contains entity identification information for use in determining an action for the entity;
   wherein an action is determined for the entity by comparing characteristics associated with the entity with characteristics associated with the entity profiles contained in the action table;
   one or more improvement data stores;
   wherein an improvement data store provides an indication in the improvement in risk based upon a change in one or more characteristics for an entity profile;
   one or more protected class data stores;
   wherein a protected class data store provides an indication of the impact of a policy change on a particular protected class, both with respect to the approval, collection, or promotion decision and relative to one or more characteristics, or combinations of characteristics, for an entity profile.

2. The system of claim 1, wherein a plurality of action tables is used to analyze a plurality of alternative policies; wherein an action table is associated with a policy.

3. The system of claim 2, wherein historical data is used to generate an initial set of alternative policies.

4. The system of claim 1, wherein the statistical data stores include one or more data stores that contain percentage distribution forecasts for the entity profiles;
   wherein the statistical data stores are used in generating a score value that indicates a level of risk associated with an action for the entity under evaluation.

5. The system of claim 1, wherein the possible actions relate to a credit approval process.

6. The system of claim 5, wherein the possible actions indicate accept or decline decisions with respect to the credit approval process.

7. The system of claim 6, wherein the action table is used within a multi-stage system to determine whether an entity is to be approved in the credit approval process.

8. The system of claim 7, wherein the first stage contains different actions than the actions in the second stage.

9. The system of claim 8, wherein the first stage includes accept or decline or investigate actions; wherein the second stage is used if the decision from the first stage is an investigate action.

10. The system of claim 5, wherein the action table is used within a single-stage system to determine whether an entity is to be approved in the credit approval process.

11. The system of claim 1, wherein the statistical data stores include a forecast of how the total population of entities is distributed with respect to the characteristics, individually and in every possible combination of each with the others that are used to define an entity profile.

12. The system of claim 1, wherein significant shifts in the applicant population percentage distribution with respect to any profile, or group of profiles, can be identified and incorporated to maintain the system's approval rate accuracy by a simple tally of the number of applicants corresponding to each cell in the action table and by adding the result to the pre-existing action table applicant cell count.

13. The system of claim 1, wherein significant shifts in the degree of risk that the system associates with each applicant profile specified in the action table can be identified and incorporated to maintain the system's risk evaluation accuracy by a simple tally of the number of good and bad loans associated with each action table reference number that were booked over a specified time period in question and by adding the resulting tallies, respectively, to the pre-existing action table good and bad counts associated with each action table cell.

14. The system of claim 1, wherein significant shifts in the account population percentage distribution with respect to any behavioral profile, or group of behavioral profiles, can be identified and incorporated to maintain the system's account mix by a simple tally of the number of accounts corresponding to each cell in the action table and by adding the results to the pre-existing action table respective cell count.

15. The system of claim 1, wherein significant shifts in the degree of risk that the system associates with each account profile specified in the action table can be identified and incorporated to maintain the system's risk evaluation accuracy by a simple tally of the number of redeemed, and non-redeemed, accounts associated with each action table reference number over a specified time period and by adding the resulting tallies, respectively, to the pre-existing action table redeemed and non-redeemed counts associated with each action table cell.

16. The system of claim 1, wherein significant differences between actual versus estimated rates of account redemption relative to every account profile specified in the action table can be identified and incorporated to ensure that the system's predicted account performance is sufficiently accurate for a collector planning a collection approach to an account, or accounts having identical behavior profiles, or credit personnel in evaluating a credit transaction authorization request or setting credit limits, or account evaluation programs at renewal time.

17. The system of claim 2, wherein two main account promotion objectives are specified,
   wherein the objectives include response to an offer and subsequent high purchase activity.

18. The system of claim 2, wherein an account activation objective is specified.

19. The system of claim 1, wherein individual components of an underwriting or pricing policy, and combinations thereof, can be tested for statistical significance relative to a plurality of protected class definitions and other givens;
   wherein the class definitions are selected from the group including race, ethnicity, gender, and age;
   wherein the givens are selected from the group including loan amount, loan type, dwelling type, occupancy status, lien status, loan amount, borrower income, geographic market, channel, and terms and conditions of the loan agreement.

20. The system of claim 2, wherein expert or policy-based business rules are used to specify an initial set of mortgage company retail-telemortgage channel underwriting policies for conventional, owner-occupied, single-family dwelling, purchase mortgages, wherein the first action table is comprised of primary factors and the second stage action table is a collection of tables comprised of secondary factors conditional on combinations of the primary factors and the possible outcomes include specific counter-offers or alternative product or program offerings, and a specific pricing sheet with up-down adjustments based upon a set of factors that may contain additional variables not already considered in the decision process in addition to approve or decline.

21. The system of claim 20, wherein expert or policy-based business rules are used to specify an initial set of mortgage company retail-telemortgage channel underwriting policies for conventional, owner-occupied, single-family dwelling, re-finance mortgages where the current mortgage is with the same institution, or as a separate case where the current mortgage is with a different institution.

22. The system of claim 20, wherein expert and policy-based business rules are used to specify an initial set of mortgage company retail-telemortgage channel underwriting policies for conventional, owner-occupied, single-family dwelling, home improvement second lien mortgages where the value of the property financed is "as-is", or as a separate case where the value of the property financed is "after improvements".

23. The system of claim 1, wherein the possible actions relate to a credit promotion process.

24. The system of claim 23, wherein the possible actions indicate accept or decline decisions with respect to the credit promotion process.

25. The system of claim 24, wherein the action table is used within a multi-stage system to determine whether an entity is to be approved in the credit promotion process.

26. The system of claim 23, wherein the action table is used within a single-stage system to determine whether an entity is to be approved in the credit promotion process.

27. The system of claim 1, wherein the possible actions relate to an account management process.

28. The system of claim 27, wherein the possible actions indicate accept or decline decisions with respect to the account management process.

29. The system of claim 28, wherein the action table is used within a multi-stage system to determine whether an entity is to be approved in the account management process.

30. The system of claim 27, wherein the action table is used within a single-stage system to determine whether an entity is to be approved in the account management process.

31. The system of claim 1, wherein the system updates for shifts in applicant mix across action table cells and for shifts in the risk associated with those cells.

32. The system of claim 1, wherein the possible actions relate to a credit pricing process.

33. The system of claim 1, wherein the possible actions relate to an insurance policy underwriting process;
   wherein types of insurance policies include automobile, renters hazard and theft, homeowners, income continuation, life, accident, and umbrella coverage.

34. The system of claim 1, wherein the possible actions relate to a pricing process for an insurance policy;
   wherein types of insurance policies include automobile, renters hazard and theft, homeowners, income continuation, life, accident, and umbrella coverage.

35. A computer-implemented method for evaluating risks associated with alternative strategies for assessing an entity with respect to a predetermined objective, comprising:
   determining an action for the entity by comparing characteristics associated with the entity with characteristics associated with entity profiles contained in an action table;
   wherein the action table contains a plurality of possible actions that can be taken with respect to the predetermined objective for various entity profiles;
   wherein the action table contains an action for each entity profile;
   wherein one or more statistical data stores are configured to contain risk amounts associated with each entity profile;
   wherein the one or more statistical data stores are configured to contain inferred percentage distribution of applicants associated with each entity profile;
   wherein a profile identification data store contains entity identification information for use in determining an action for the entity;
   using an improvement data store to provide an indication in the improvement in risk based upon a change in one or more characteristics for an entity profile; and
   using a protected class data store to provide an indication of the impact of a policy change on a particular protected class, both with respect to the approval, collection, or promotion decision and relative to one or more characteristics, or combinations of characteristics, for an entity profile.

* * * * *

UNITED STATES PATENT AND TRADEMARK OFFICE
CERTIFICATE OF CORRECTION

| | | |
|---|---|---|
| PATENT NO. | : 7,610,257 B1 | Page 1 of 1 |
| APPLICATION NO. | : 11/651914 | |
| DATED | : October 27, 2009 | |
| INVENTOR(S) | : Abrahams | |

It is certified that error appears in the above-identified patent and that said Letters Patent is hereby corrected as shown below:

In column 42, line 37, after the word "profile;" insert a paragraph.

Signed and Sealed this

Twenty-third Day of March, 2010

David J. Kappos
*Director of the United States Patent and Trademark Office*